US012701195B1

(12) United States Patent
Englander et al.

(10) Patent No.: US 12,701,195 B1
(45) Date of Patent: *Aug. 4, 2026

(54) METHOD AND SYSTEM WITH MULTIPLE CAMERA UNITS INSTALLED IN PROTECTIVE ENCLOSURE

(71) Applicant: Rosco, Inc., Jamaica, NY (US)

(72) Inventors: Benjamin Englander, Woodmere, NY (US); Julian Serer, Plainview, NY (US); Peter Plate, Northport, NY (US); Gary Balsam, Brunswick, NJ (US)

(73) Assignee: Rosco, INC., Jamaica, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/784,803

(22) Filed: Jul. 25, 2024

Related U.S. Application Data

(60) Continuation of application No. 18/317,234, filed on May 15, 2023, now Pat. No. 12,069,401, which is a (Continued)

(51) Int. Cl.
 *G06F 15/16* (2006.01)
 *B60R 11/04* (2006.01)
 (Continued)

(52) U.S. Cl.
 CPC ............... *H04N 5/77* (2013.01); *B60R 11/04* (2013.01); *G06V 20/56* (2022.01); *G06V 20/597* (2022.01);
 (Continued)

(58) Field of Classification Search
 CPC ......... H04N 5/77; H04N 5/772; H04N 5/907; H04N 7/005; H04N 7/18; H04N 7/181;
 (Continued)

(56) References Cited

U.S. PATENT DOCUMENTS

| | | | |
|---|---|---|---|
| 4,638,289 | A | 1/1987 | Zottnik |
| 5,262,813 | A | 11/1993 | Bamford |

(Continued)

FOREIGN PATENT DOCUMENTS

| | | |
|---|---|---|
| JP | 2004075033 A | 3/2004 |
| JP | 2008118482 A | 5/2008 |
| WO | 2003049446 A1 | 6/2003 |

OTHER PUBLICATIONS

Trivedi et al., "Looking-In and Looking-Out of a Vehicle: Computer-Vision-Based Enhanced Vehicle Safety," IEEE Transactions on Intelligent Transportation Systems, vol. 8, No. 1, pp. 108-120, Mar. 1, 2007.

(Continued)

*Primary Examiner* — Moustafa M Meky
(74) *Attorney, Agent, or Firm* — Manatt, Phelps & Phillip

(57) ABSTRACT

A system and method for simultaneously and continuously capturing video from the interior and exterior of a vehicle. The system includes, for example, a first housing including a first connection mechanism, first and second cameras and a memory disposed in the first housing. The system also includes a second housing including a second connection mechanism adapted to be removably connected to the first connection mechanism of the first housing and encasing said first housing within the second housing. A mounting mechanism is adjustably connected to said second housing and configured to maintain at least one of the first camera and the second camera in a predetermined position by adjusting the second housing. Additional embodiments are also described including a method for capturing data.

20 Claims, 30 Drawing Sheets

Related U.S. Application Data continuation of application No. 16/882,312, filed on May 22, 2020, now Pat. No. 11,778,136, which is a continuation of application No. 16/141,654, filed on Sep. 25, 2018, now Pat. No. 10,666,893, which is a continuation of application No. 15/495,821, filed on Apr. 24, 2017, now Pat. No. 10,091,453, which is a division of application No. 13/972,210, filed on Aug. 21, 2013, now Pat. No. 9,635,319, which is a division of application No. 12/608,600, filed on Oct. 29, 2009, now Pat. No. 8,520,070.

(60) Provisional application No. 61/245,080, filed on Sep. 23, 2009, provisional application No. 61/109,763, filed on Oct. 30, 2008.

(51) Int. Cl.

| | |
|---|---|
| *G06V 20/56* | (2022.01) |
| *G06V 20/59* | (2022.01) |
| *G07C 5/08* | (2006.01) |
| *G11B 27/00* | (2006.01) |
| *H04N 5/77* | (2006.01) |
| *H04N 5/907* | (2006.01) |
| *H04N 7/18* | (2006.01) |
| *H04N 9/806* | (2006.01) |
| *H04N 9/82* | (2006.01) |
| *H04N 23/51* | (2023.01) |
| *B60R 1/12* | (2006.01) |

(52) U.S. Cl.
CPC .......... *G07C 5/0866* (2013.01); *G11B 27/005* (2013.01); *H04N 5/772* (2013.01); *H04N 5/907* (2013.01); *H04N 7/18* (2013.01); *H04N 7/181* (2013.01); *H04N 9/806* (2013.01); *H04N 9/8205* (2013.01); *H04N 23/51* (2023.01); *B60R 2001/1253* (2013.01)

(58) Field of Classification Search
CPC ...... H04N 9/806; H04N 9/8205; B60R 11/04; B60R 2001/1253; B06V 20/56; B06V 20/597; G07C 5/0866; G11B 27/005
USPC .......................................... 386/223; 709/200
See application file for complete search history.

(56) References Cited

U.S. PATENT DOCUMENTS

| | | | | |
|---|---|---|---|---|
| 5,680,123 | A | 10/1997 | Lee | |
| 6,170,955 | B1 | 1/2001 | Campbell et al. | |
| 6,333,759 | B1 | 12/2001 | Mazzilli | |
| 6,389,340 | B1 | 5/2002 | Rayner | |
| 6,690,268 | B2 * | 2/2004 | Schofield | B60K 35/81 |
| | | | | 348/148 |
| 6,795,111 | B1 | 9/2004 | Mazzilli | |
| 6,927,674 | B2 | 8/2005 | Harter, Jr. et al. | |
| 7,386,376 | B2 | 6/2008 | Basir et al. | |
| 7,446,650 | B2 * | 11/2008 | Scholfield | B60Q 1/543 |
| | | | | 348/148 |
| 7,579,939 | B2 | 8/2009 | Schofield et al. | |
| 7,619,508 | B2 | 11/2009 | Lynam et al. | |
| 7,834,910 | B2 | 11/2010 | DeLorme | |
| 7,865,280 | B2 | 1/2011 | Fujinawa et al. | |
| 7,893,958 | B1 | 2/2011 | D'Agostino | |
| 7,983,811 | B2 | 7/2011 | Basir et al. | |
| 8,045,766 | B2 | 10/2011 | Ishida et al. | |
| 8,063,786 | B2 | 11/2011 | Manotas, Jr. | |
| 8,237,855 | B2 | 8/2012 | Chou | |
| 8,396,623 | B2 | 3/2013 | Maeda et al. | |
| 8,520,070 | B1 | 8/2013 | Englander et al. | |
| 8,547,435 | B2 | 10/2013 | Mimar | |
| 8,665,099 | B2 | 3/2014 | Namba et al. | |
| 8,996,240 | B2 | 3/2015 | Plante | |
| 9,014,966 | B2 * | 4/2015 | Taylor | G01C 21/365 |
| | | | | 701/410 |
| 9,172,903 | B1 | 10/2015 | Englander et al. | |
| 9,446,715 | B2 | 9/2016 | Schofield et al. | |
| 9,491,420 | B2 | 11/2016 | Mimar | |
| 9,635,319 | B1 | 4/2017 | Englander et al. | |
| 9,702,703 | B2 | 7/2017 | Chowdhury | |
| 9,940,528 | B2 * | 4/2018 | Higgins-Luthman | |
| | | | | H04N 25/76 |
| 9,955,319 | B2 | 4/2018 | Matus | |
| 10,091,453 | B1 | 10/2018 | Englander et al. | |
| 10,204,159 | B2 | 2/2019 | Angel | |
| 10,272,921 | B2 | 4/2019 | Edgington | |
| 10,509,972 | B2 * | 12/2019 | Higgins-Luthman | |
| | | | | B60Q 9/008 |
| 10,631,147 | B2 | 4/2020 | Matus | |
| 10,666,893 | B1 | 5/2020 | Englander et al. | |
| 10,687,030 | B2 | 6/2020 | Schimelpfenig | |
| 10,878,646 | B2 | 12/2020 | Plante | |
| 10,967,793 | B2 * | 4/2021 | Stein | B60R 11/04 |
| 11,778,136 | B1 | 10/2023 | Englander | |
| 12,069,401 | B1 * | 8/2024 | Englander | H04N 5/77 |
| 2002/0003571 | A1 | 1/2002 | Schofield et al. | |
| 2004/0145457 | A1 * | 7/2004 | Schofield | B60S 1/0844 |
| | | | | 340/425.5 |
| 2005/0088522 | A1 | 4/2005 | Creviston | |
| 2005/0140785 | A1 | 6/2005 | Mazzilli | |
| 2006/0192658 | A1 | 8/2006 | Yamamura | |
| 2007/0268368 | A1 * | 11/2007 | Bradford | G07C 5/0891 |
| | | | | 348/148 |
| 2008/0117298 | A1 | 5/2008 | Torres | |
| 2008/0239077 | A1 * | 10/2008 | Kurylo | H04N 7/18 |
| | | | | 348/148 |
| 2009/0187300 | A1 * | 7/2009 | Everitt | G01C 21/3602 |
| | | | | 701/119 |
| 2010/0033570 | A1 | 2/2010 | Plaster | |
| 2010/0077437 | A1 | 3/2010 | McManus et al. | |
| 2010/0182398 | A1 | 7/2010 | Mazzilli | |
| 2012/0062744 | A1 | 3/2012 | Schofield et al. | |
| 2013/0229522 | A1 * | 9/2013 | Schofield | B60Q 1/2665 |
| | | | | 348/148 |
| 2014/0192181 | A1 * | 7/2014 | Taylor | G01S 13/867 |
| | | | | 348/118 |
| 2015/0151682 | A1 | 6/2015 | Gadotti | |
| 2016/0078305 | A1 * | 3/2016 | Higgins-Luthman | |
| | | | | G06V 20/58 |
| | | | | 348/118 |
| 2016/0282124 | A1 | 9/2016 | Chowdhury | |
| 2017/0057492 | A1 | 3/2017 | Edgington | |
| 2018/0077538 | A1 | 3/2018 | Matus | |
| 2018/0206090 | A1 | 7/2018 | Matus | |
| 2018/0225528 | A1 * | 8/2018 | Higgins-Luthman | |
| | | | | G06V 20/588 |
| 2020/0062180 | A1 * | 2/2020 | Stein | B60S 1/0822 |
| 2020/0213825 | A1 | 7/2020 | Matus | |
| 2023/0254673 | A1 | 8/2023 | Matus | |

OTHER PUBLICATIONS

Bergasa et al., "Real-time system for monitoring driver vigilance," IEEE Transactions on Intelligent Transportation Systems, vol. 7, No. 1, pp. 63-77, Mar. 6, 2006.
Pohl et al., "A driver-distraction-based lane-keeping assistance system," Proceedings of the Institution of Mechanical Engineers, Part I: Journal of Systems and Control Engineering, vol. 221, No. 4, pp. 541-552, Jun. 1, 2007.
The New Indian Express, "Cars that know their drivers," Sep. 24, 2009, HT Digital Streams Limited, Chennai, Iceland.
Sathyanarayana et al., "Body sensor networks for driver distraction identification," Proceedings of the 2008 IEEE International Conference on Vehicular Electronics and Safety, pp. 120-125, Sep. 22, 2008.

* cited by examiner

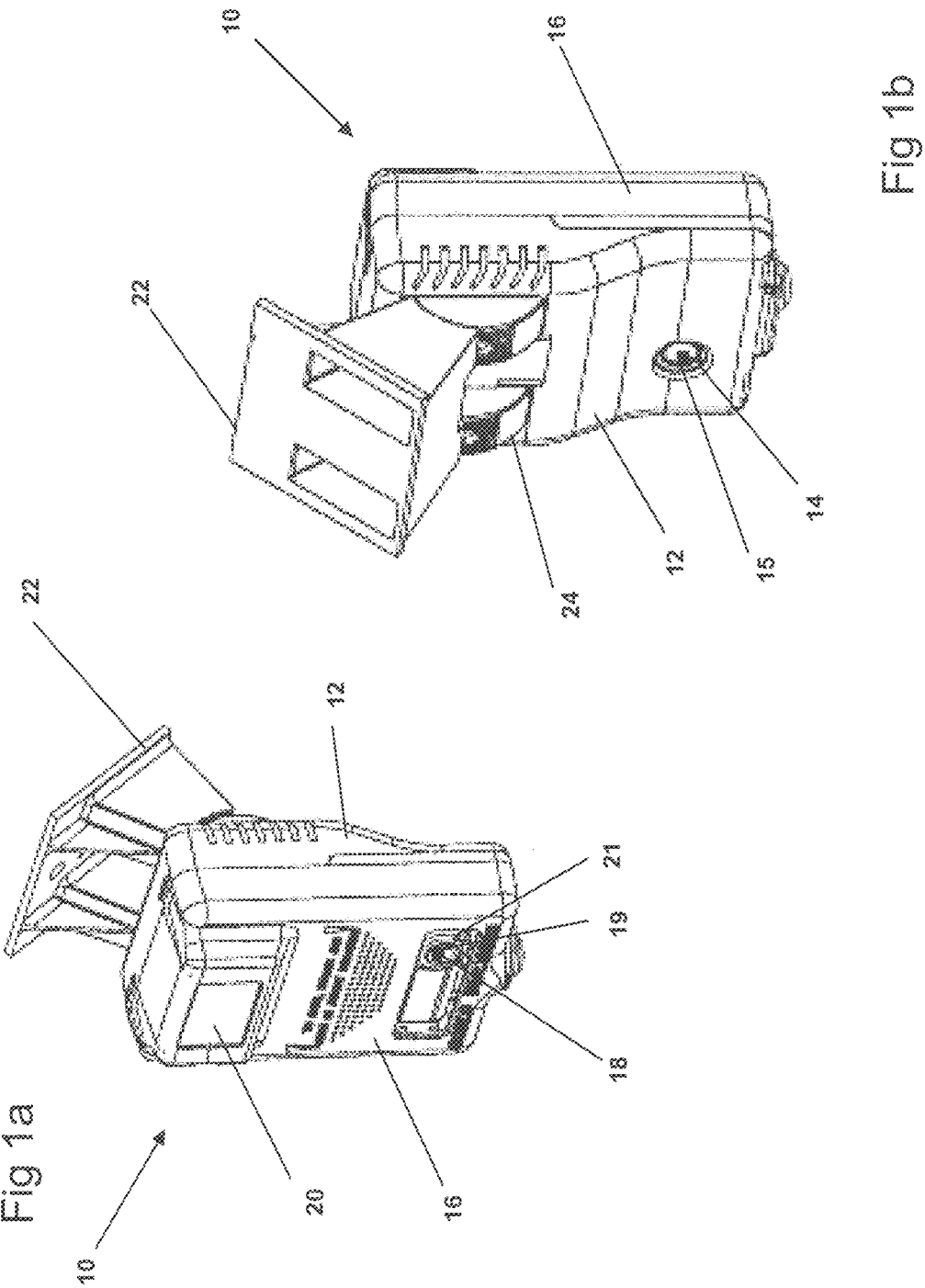

SEEN FROM BEHIND THE DRIVER

SEEN FROM BEHIND THE DRIVER

SEEN FROM BEHIND THE DRIVER

SEEN FROM ABOVE THE DRIVER

SEEN FROM ABOVE THE DRIVER

SEEN FROM ABOVE THE DRIVER

METHOD AND SYSTEM WITH MULTIPLE CAMERA UNITS INSTALLED IN PROTECTIVE ENCLOSURE

CROSS REFERENCE TO RELATED APPLICATIONS

This application is a Continuation of U.S. patent application Ser. No. 18/317,234, filed on May 15, 2023, now U.S. Pat. No. 12,069,401, which is a Continuation of U.S. patent application Ser. No. 16/882,312, filed on May 22, 2020, now U.S. Pat. No. 11,778,136, which is a Continuation of U.S. patent application Ser. No. 16/141,654, filed on Sep. 25, 2018, now U.S. Pat. No. 10,666,893, which is a Continuation of U.S. patent application Ser. No. 15/495,821, filed on Apr. 24, 2017, now U.S. Pat. No. 10,091,453, which is a Continuation of U.S. patent application Ser. No. 13/972,210, filed on Aug. 21, 2013, now U.S. Pat. No. 9,635,319, which a Division of U.S. patent application Ser. No. 12/608,600, filed on Oct. 29, 2009, now U.S. Pat. No. 8,520,070, which in turn claims priority to U.S. Provisional Application Nos. 61/109,763, filed Oct. 30, 2008 and 61/245,080, filed Sep. 23, 2009. All of the above applications are incorporated herein by reference.

FIELD OF THE INVENTION

The present invention relates generally to the field of motor vehicle recording systems and methods, and in particular, to a system and/or method that records the interior and exterior of a vehicle with video and audio recordings and stores the recordings upon the occurrence of one or more predetermined recording events, optionally utilizing a protective enclosure.

SUMMARY OF THE INVENTION

It is one optional and/or alternative feature and advantage of the present invention to enable capture of video from at least two cameras configured to capture video in at least two directions.

It is another optional and/or alternative featured an advantage of the present invention to enable continuous capture of video from at least two cameras and protect a portion of the captured video upon the occurrence of a predetermined event.

These features and advantages of the present invention are achieved by providing two cameras within a housing, wherein the first camera is oriented to capture video in the direction of travel of the vehicle and the second camera is oriented to capture video in the direction of the interior of the vehicle. In at least one embodiment, video from the first and second cameras is captured on a memory in a continuous loop, where the oldest unprotected video is overwritten with the newest unprotected video.

In other embodiments, upon the occurrence of a predetermined event, a portion of video from the first and second cameras is protected from erasure or overwriting by the continuous loop. The portion can include a predetermined amount of video captured before the occurrence of the predetermined event. This portion can allow a reviewer of the data to view the interior and exterior of the vehicle for a portion of time leading to, during and/or after, the occurrence of the predetermined event.

The predetermined event can include, for example, one or more of the vehicle decelerating faster than a predetermined rate, the vehicle accelerating faster than a predetermined rate a collision or a trigger provided to the driver to initiate capture of protected video. In at least one embodiment, detection of vehicle deceleration, acceleration and collisions is made by at least one accelerometer. In some embodiments, accelerometers are provided to measure forces in at least two dimensions. In some embodiments, accelerometers are provided to measure forces in three dimensions. Protected video may be viewed by a transportation manager or other authorized personnel at a later time. According to various embodiments, protected video may be downloaded to another memory or computer.

In various embodiments, at least one counter is provided to indicate the number of occurrences each type of event.

In various embodiments, a GPS receiver is provided to determine the location of the vehicle. In other embodiments, the GPS receiver can be used to determine the speed of the vehicle and the direction of travel of the vehicle. In some embodiments, at least one of the speed, direction of travel of the vehicle and the latitude and longitude of the vehicle is recorded with the video from the first and second cameras.

In various embodiments, the first and second camera may be provided as part of other vehicle components. For example, the first and second camera can be included as part of a rearview mirror, vehicle visor or monitor. In some embodiments, protected video may be viewed or reviewed on the monitor.

In some embodiments, a light is provided to illuminate the interior of the vehicle to aid the recording of video by the second camera. In some embodiments, the light is an infrared light or other non-visible wavelength to which the second camera is sensitive.

In some embodiments of the present invention, a computer implemented method of reviewing and graphically displaying the recorded data is provided for reviewing protected video. According to some embodiments, the method allows the protect video to be organized in several fashions, including the date and/or time of capture, and the type of predetermined occurrence that triggered capture of the video (e.g., deceleration, collision, etc.). In some embodiments, a computer executes software that enables a reviewer to view the video captured by both cameras simultaneously. In other embodiments, the reviewer may also be provided with information about the vehicle at the time of the video capture, for example, the speed of the vehicle, the direction of travel of the vehicle, the latitude and longitude of the vehicle and measurements from one or more accelerometers. In some embodiments, the software allows a reviewer to stop, rewind, fast forward and review video in slow motion for both cameras simultaneously, i.e., the video from both cameras remains synchronized. In other embodiments, the computer executes software that enables information associated with the vehicle during video capture to remain synchronized.

In alternative and optional embodiments, a protective enclosure is provided for securing and preventing tampering of the recording device, while enabling a variety of mounting options to the vehicle, including windshield mount, dashboard mount, and the like. In alternative and optional embodiments, the protective enclosure is adapted to facilitate access to the stored data while providing protection for the recording device. In alternative and optional embodiments, additional recording devices, including additional cameras, may be provided exterior to the vehicle and optionally mounted to the vehicle, additional accessories mounted to the vehicle, such as rearview and/or cross view mirrors.

In alternative and optional embodiments, recording cameras are provided that are integrated into an accessory, such as a visor, dashboard, cross view mirror and/or a rear view mirror for additional views to be recorded and/or for optional real-time display to the driver. In alternative and optional embodiments, one or more of the cameras are integrated into a display monitor, and used in connection with the additional components of the invention as described herein.

These, together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

FIGS. 1a and 1b depict one embodiment of a dual-camera system according to the present invention;

DETAILED DESCRIPTION OF THE PREFERRED EMBODIMENTS

Figure 1D:
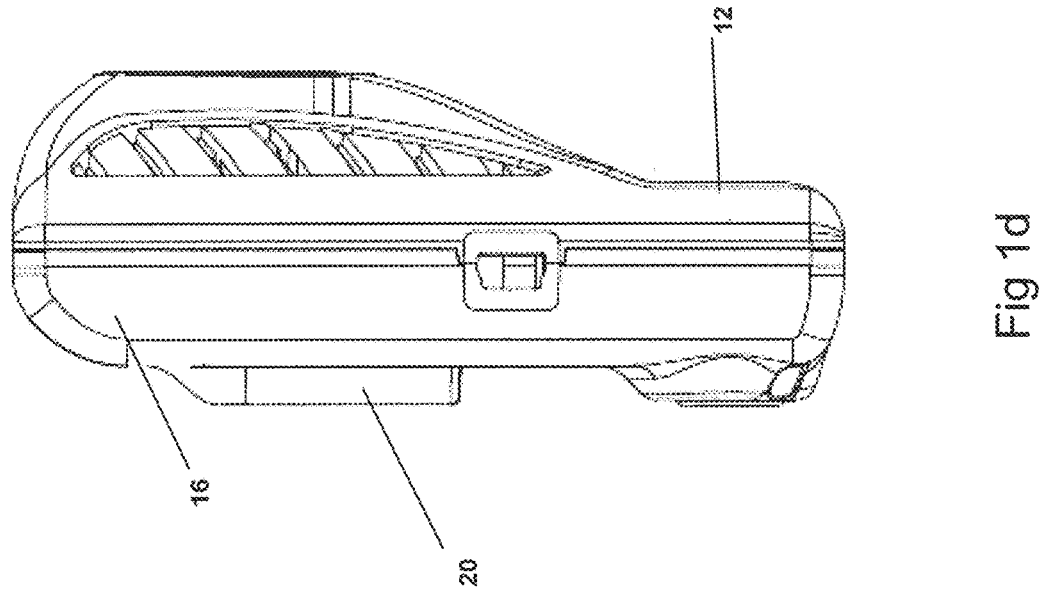
FIGS. 1c-f depict various angles of one embodiment of a dual-camera system according to the present invention.
Figure 1C:
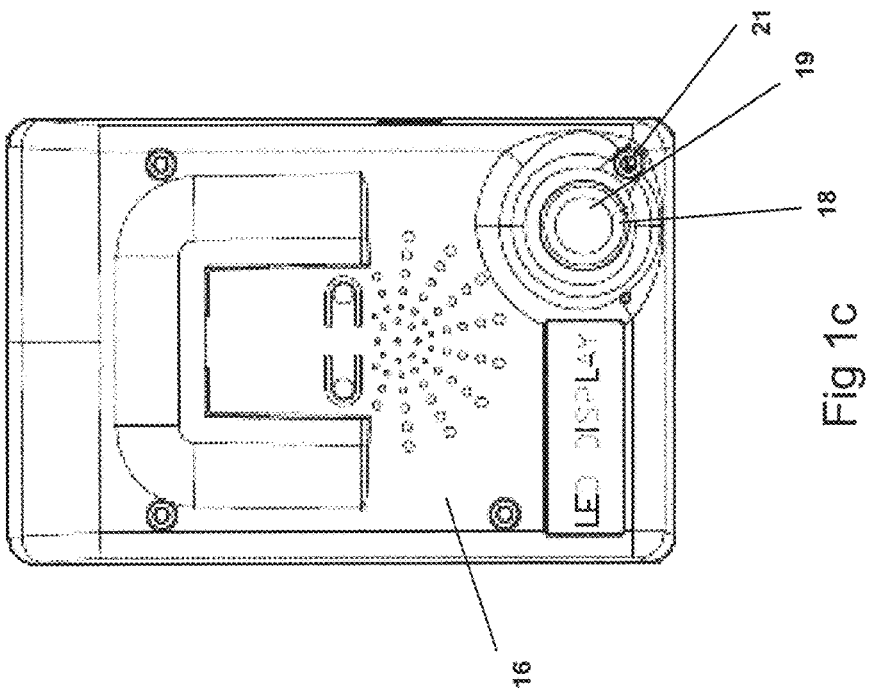
Figure 1F:
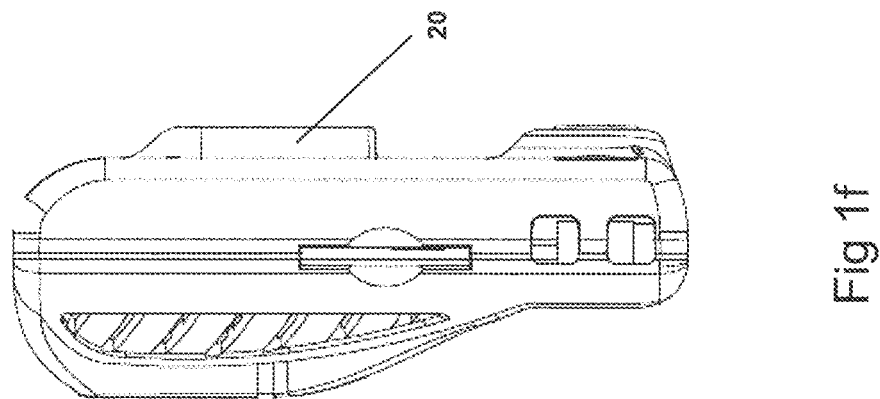
Figure 1E:
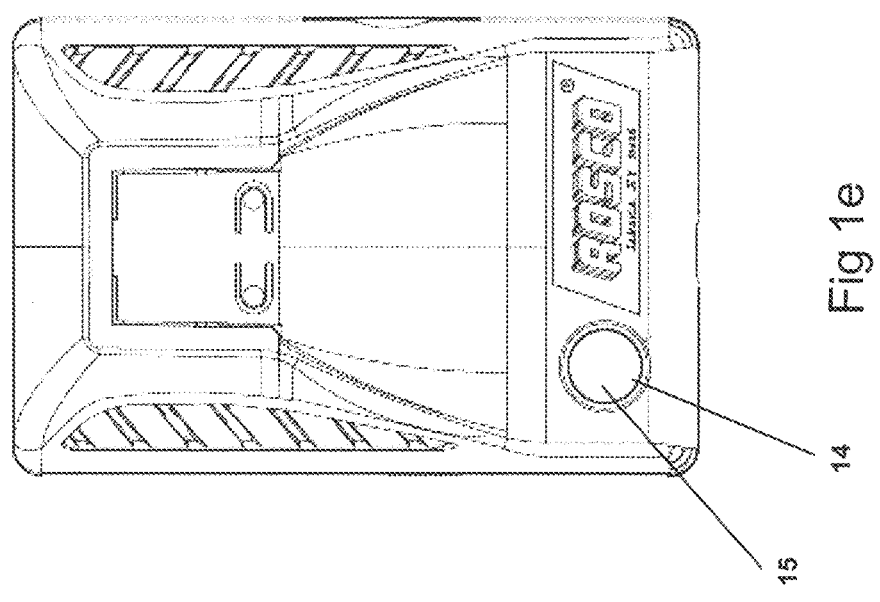

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

In the following description, reference is made to the accompanying drawings that form a part of the present disclosure, and in which are shown, by way of illustration, specific embodiments of the invention. These embodiments are described in sufficient detail to enable those skilled in the art to practice the invention, and it is to be understood that other embodiments may be utilized and that structural and other changes may be made without departing from the scope of the present invention. The present disclosure is, therefore, not to be taken in a limiting sense. The present disclosure is neither a literal description of all embodiments of the invention nor a listing of features of the invention that must be present in all embodiments.

Numerous embodiments are described in this patent application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with various modifications and alterations. Although particular features of the present invention may be described with reference to one or more particular embodiments or figures, it should be understood that such features are not limited to usage in the one or more particular embodiments or figures with reference to which they are described.

The specific sequence of the described process of the present invention may be altered so that certain processes are conducted in parallel or independent, with other processes, to the extent that the processes are not dependent upon each other. Thus, the specific order of steps described herein is not to be considered implying a specific sequence of steps to perform the process. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The terms "an embodiment", "embodiment", "embodiments", "the embodiment", "the embodiments", "an embodiment", "some embodiments", and "one embodiment" mean "one or more (but not all) embodiments of the present invention(s)" unless expressly specified otherwise.

The terms "including", "having," "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The terms "a", "an" and "the" mean "one or more", unless expressly specified otherwise.

Headings of sections provided in this patent application and the title of this patent application are for convenience only, and are not to be taken as limiting the disclosure in any way.

The present invention generally relates to audio and video recording systems for vehicles, wherein the system records images of both the interior and exterior of the vehicle. Specifically, the present invention provides for recording the interior and exterior of a vehicle on a continuous loop, with the oldest data erased by more recent video, and will save sequences of video and audio recordings based upon certain predetermined recording events.

The dual-vision system 10 of the present invention includes in at least one embodiment two cameras within the same housing: one camera captures video of the interior of the vehicle, while the second camera captures video of vehicles, pedestrians, road signs, traffic lights, etc. in front of the vehicle. In alternative embodiments, the dual-vision system 10 is provided with a microphone to record audio within the interior of the vehicle. In alternative embodiments, different numbers of cameras can be used with different field of views, from a single camera to a number of different cameras. One advantage of the present invention allows the recording of the video of the driver and/or passengers of the vehicle in addition to video of the outside of the vehicle to allow review of events, such as distractions to the driver within the vehicle, car accidents, near-accidents, etc.

For example, according to one embodiment, the present invention records images from both a camera pointed in the direction of travel of the vehicle as well as a camera pointed towards the interior of the vehicle. In some embodiments, the cameras capture images at regular intervals, for example, one frame every second or every other second, whereas in other embodiments, the cameras capture motion video at 15 frames per second, 24 frames per second or 30 frames per second. In alternative embodiments, the invention stores video in a continuous loop on a memory or other standard data storage device, for example, a standard SD card. As will be understood, other types of standard memory devices such as hard drives, data storage, tape drives, etc. are contemplated by the present invention. In alternative embodiments, the memory card, e.g., SD card and the like, for the recording device is removable. The memory card may be lockable to prevent theft or tampering with the data.

Video will continue to be captured, overwriting non-protected portions of the memory until a recording event occurs such as the driver pressing a panic button, a g-force measured beyond a certain threshold by an accelerometer in 3-axis, a g-force measured beyond a certain threshold by an accelerometer in 2 axis, a sufficient bump is measured by an accelerometer, excessive brake is measured by an accelerometer or other device connected to the vehicle braking system, speed exceeds a certain predetermined threshold, and the like. Audio and/or video captured in response to a recording event is stored for later review and will not be overwritten by continuous loop recording until indicated by an individual with sufficient permissions, e.g., transportation manager. Captured video and/or audio recorded in response to a recording event, in alternative embodiments, is recorded on a separate part of the memory card or alternatively a separate memory that cannot be over-written except by someone with additional permissions, e.g., transportation manager. In some embodiments, video and/or audio captured before and/or after the event is stored in a separate memory or protected area of the memory or marked as non-erasable to prevent its erasure. In some embodiments, the type of recording event, e.g., braking event, collision, etc., is stored along with the audio and/or video of the recording event to allow sorting of recordings at a later time.

In certain embodiments, the dual-vision system 10 is provided with a built-in standard GPS sensor, which can determine the location, speed and direction of the vehicle. In certain embodiments, the GPS location of the vehicle is recorded along with the audio and/or video recorded in a continuous loop. In other embodiments, the GPS location is recorded only when a recording event occurs.

In alternative embodiments, an event counter is beneficially provided that counts by each type of recording event in the aggregate and/or separate counter for each type of event. The counter includes or is connected to a display that displays either always or by request/actuation of a switch that optionally is only accessible to the manager for efficient determination whether the actual recording events should be viewed by, e.g., the manager.

In alternative embodiments, an audible chime is included that makes an audible sound and/or light indicator that illuminates if the vehicle/driver exceeds predetermined speed and/or for predetermined recording events such as excessive braking, and the like.

In alternative embodiments, a delay timer is included which allows the device to continue to capture video for a predetermined time after the ignition is turned off. Alternatively, the system captures still frames at regular intervals (e.g. 15 or 30 sec) to see if anyone is in and/or around the vehicle and/or captures video and/or still images when the ignition is off and a motion detector is triggered to prevent theft and/or record events in the vicinity of the vehicle.

In alternative embodiments, when forward and backward cameras are used, either two separate cameras are provided on opposite sides of a mirror, such as a rearview mirror, one camera pointing forward and another pointing backward. In other embodiments, a single structure having two cameras integrated therein, one pointing forward and the second pointing backward as described herein may be used.

According to one embodiment of the present invention, the invention is provided with a housing containing two cameras, where each camera is directed in opposite directions to capture images in the interior of a vehicle and exterior of a vehicle. For example, referring to FIGS. 1a and 1b, one embodiment of the present invention is depicted. A dual-vision system 10 is shown, where a front housing 12 contains a first camera opening 14 that allows a first camera 15 to be directed to the front of the vehicle when dual-vision system 10 is mounted, for example, within a vehicle. A back housing 16 contains a second camera opening 18 that allows a second camera 19 to be directed to the interior of the vehicle when the dual-vision system 10 is mounted within a vehicle. Either or both of first camera 15 and second camera 19 may be wide-angle, fixed focal length and/or zoom to allow various views from the cameras. Back housing 16 may optionally contain a microphone opening 21 to enable recording audio within the vehicle during operation. Front housing 12 and back housing 16 may be composed of any suitable material such as, for example, plastic, resin, metal, etc. In alternative embodiments, the housing may be connected to the exterior of the vehicle and/or may be used for other applications besides connection to the vehicle.

A light source 20 is provided that illuminates the interior of the vehicle during low lighting situations. In some embodiments, light source 20 is a replaceable standard infrared LED light source or other standard light source. Light source 20 can be provided with a clear protective lens, which is easily replaceable, and can protect expensive optical elements that could be vandalized. According to some embodiments, the light source 20 automatically illuminates vehicle interior in low light conditions. Light source 20 may alternatively provide illumination in a visible range, infrared range or both. The light source 20 can be compact and attachable without hardware, or it may have a low profile, with fasteners required for assembly. In embodiments wherein light source 20 provides illumination in an infrared range, second camera 19 is supplied with at least one image sensor capable of sensing light in the infrared range.

Mount 22 is optionally provided that connects dual-vision system 10 to a windshield, ceiling, mirror or dashboard. The housing attaches to the windshield/ceiling mount via tooth mesh (similar to gears, except there is no rotation permitted when the securing screw is tightened). The housing mount can be adjusted in reference to the mount so that it always is in a vertical and/or predetermined position. The present invention provides significant advantages of recording, while not degrading the (sometimes) limited amount of open space available for the driver to maintain maximum visibility through the windshield.

Figure 2:
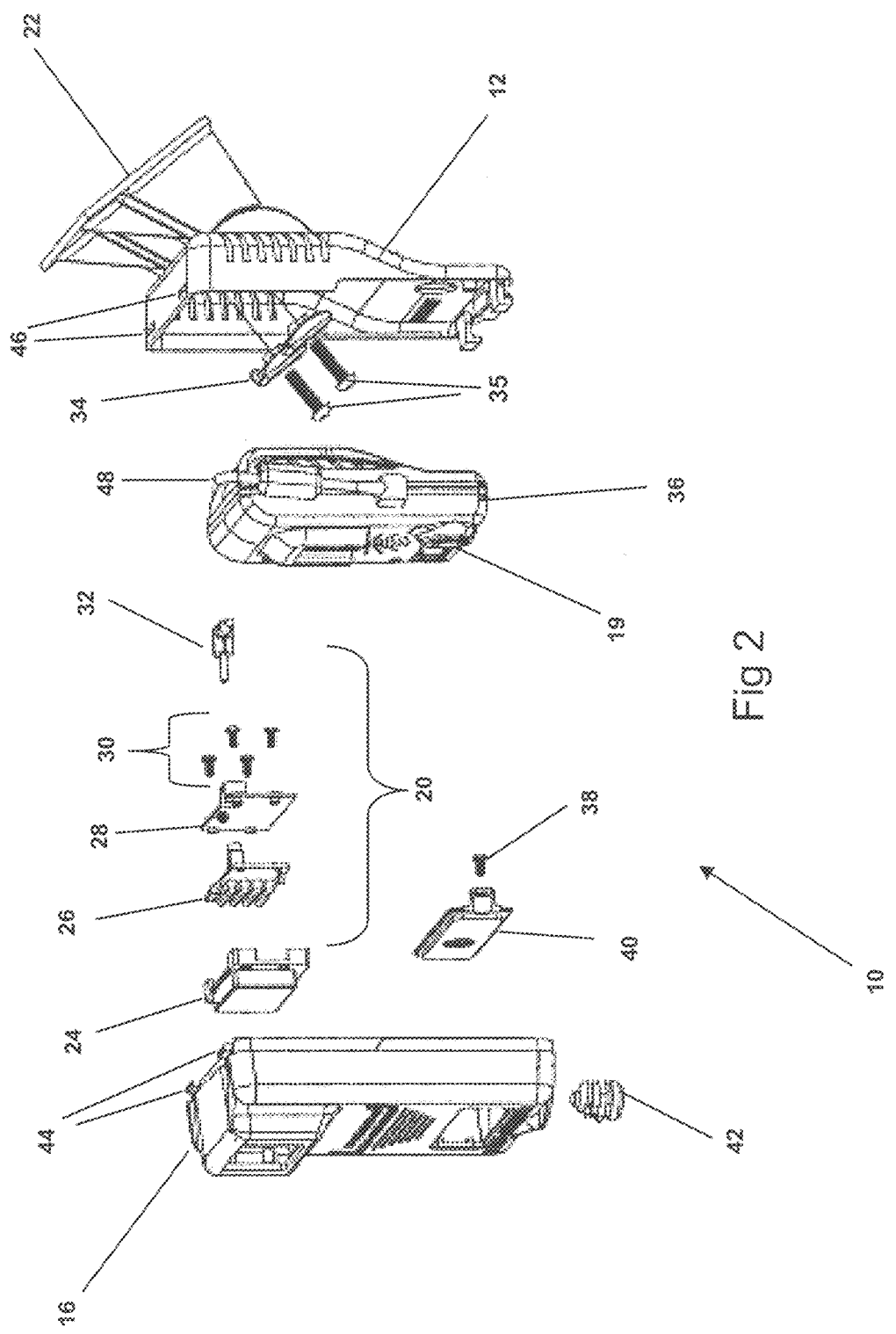
FIG. 2 depicts and exploded view of one embodiment of a dual-camera system according to the present invention.

FIGS. 1c-f depict alternate views of a dual camera system unit 36 depicted in FIG. 2 that is affixed to, and enclosed within, the exterior housing 10 according to some embodiments of the present invention.

Referring to FIG. 2, an exploded view of a dual-vision system 10 according to one embodiment of the present invention is depicted. Light source 20 is comprised of clear LED protective lens 24, LED circuit board 26, LED backplate 28, one or more screws 30 and LED power jack 32. In some embodiments, protective lens 24 contains a filter to provide illumination in other light ranges such as, for example, infrared. In operation, LED circuit board may provide illumination in various light ranges such as, visible or infrared. Power jack 32 may be connected to an independent power source or may share a power source with other components of system 10. Light source 18 can be a preassembled component that snaps into back housing 16 or is received by an indent in housing back 16. In other embodiments, light source 18 is fixed to housing back 16 by screws or rivets. In alternative embodiments, the light source may be integrated with one or more of the cameras, may be separately mounted to the housing and/or may include a plurality of different types of light sources directed in any number of directions.

Unit 36 contains first camera (not shown) and second camera 19. In various embodiments, unit 36 is provided with at least one microphone for recording audio in addition to the outputs of the camera. Camera unit 36 may advantageously be affixed, via for example, being snapped into one or both of housing back 16 and housing front 12, or may be received by an indent in one or both of housing back 16 and housing front 12. In other embodiments, unit 36 is fixed to one or both of housing back 16 and housing front 12 by screws or rivets. Unit 36 is provided with power through power cable 48 and an optional light source. In some embodiments, camera unit may be connected to an independent power source, may include its own power source and/or may share a power source with other components of system 10. According to one advantage of the present invention, unit 36 is portable and a self-contained unit that may be advantageously be removed from the housing to protect the camera unit, light source and/or memory from theft, tampering and/or vandalism. In other embodiments, the unit 36 and light source 20 may be advantageously removed from the housing together to provide portability and protection of the cameras, memory, processor, recording unit and/or LED circuit board 26.

The unit 36 of the present invention in at least one embodiment is connected to the vehicle's ignition system to receive power. In accordance with this embodiment, the camera unit(s) will only start when ignition is turned on. In some embodiments, the camera unit(s) stops capturing audio/video after a preset (user determined) interval or immediately after ignition is turned off. In other embodiments, power to the dual-camera system is provided through a cigarette lighter cord, standard 120V or 240V power cord, USB cord, or the like. In other embodiments, the dual-camera system is hardwired into the electrical system of the vehicle.

In other embodiments, a rechargeable battery powers the system 10 and camera unit 36. The camera unit optionally operates (on battery power) even when it is not cradled in the housing, in case the driver needs to capture audio/video outside the camera's normal field of vision (e.g., vehicle body damage after a collision). Alternative power mechanisms and/or battery backup mechanisms may be used, and alternative procedures for starting and stopping recording of audio and/or video may be utilized.

Additionally, unit 36 is provided with means for recording the output of the cameras. For example, in some embodiments unit 36 is provided with an internal hard drive, data storage device and/or other standard memory device to record the outputs of the cameras and optional microphone. In various embodiments, the outputs of the cameras and optional microphone are recorded instead of the fixed memory device and/or in addition to the fixed memory storage device, on removable media such as, for example, SD memory. In one embodiment, each of the first and second cameras are connected via 16-bit connection to a circuit board, and a memory device such as an SD card. Direct connection enables the memory to receive the video and audio signals in their original digital format, and store it as such. As will be understood, the memory device may be removed from the housing to allow the contents of the memory to be reviewed at another location. Further, the portability of the memory device protects it from theft and vandalism An adjustment mechanism is provided that allows the angle of the housing 12 to be changed relative to the surface to which the system 10 is mounted. Screws 35 are used to connect housing front 12 to mount 22. Pressure bushings 34 are provided such that sufficient clamping force is used to prevent housing front 12 from loosening from the mount 22. Mount 22 may be adjusted to change the angle of the dual-vision system 10 with respect to, for example, windshields or dashboards with various slopes or angles while allowing the dual-vision system 10 to remain fixed in a vertical position.

Figures 3A, 3B, 3C:
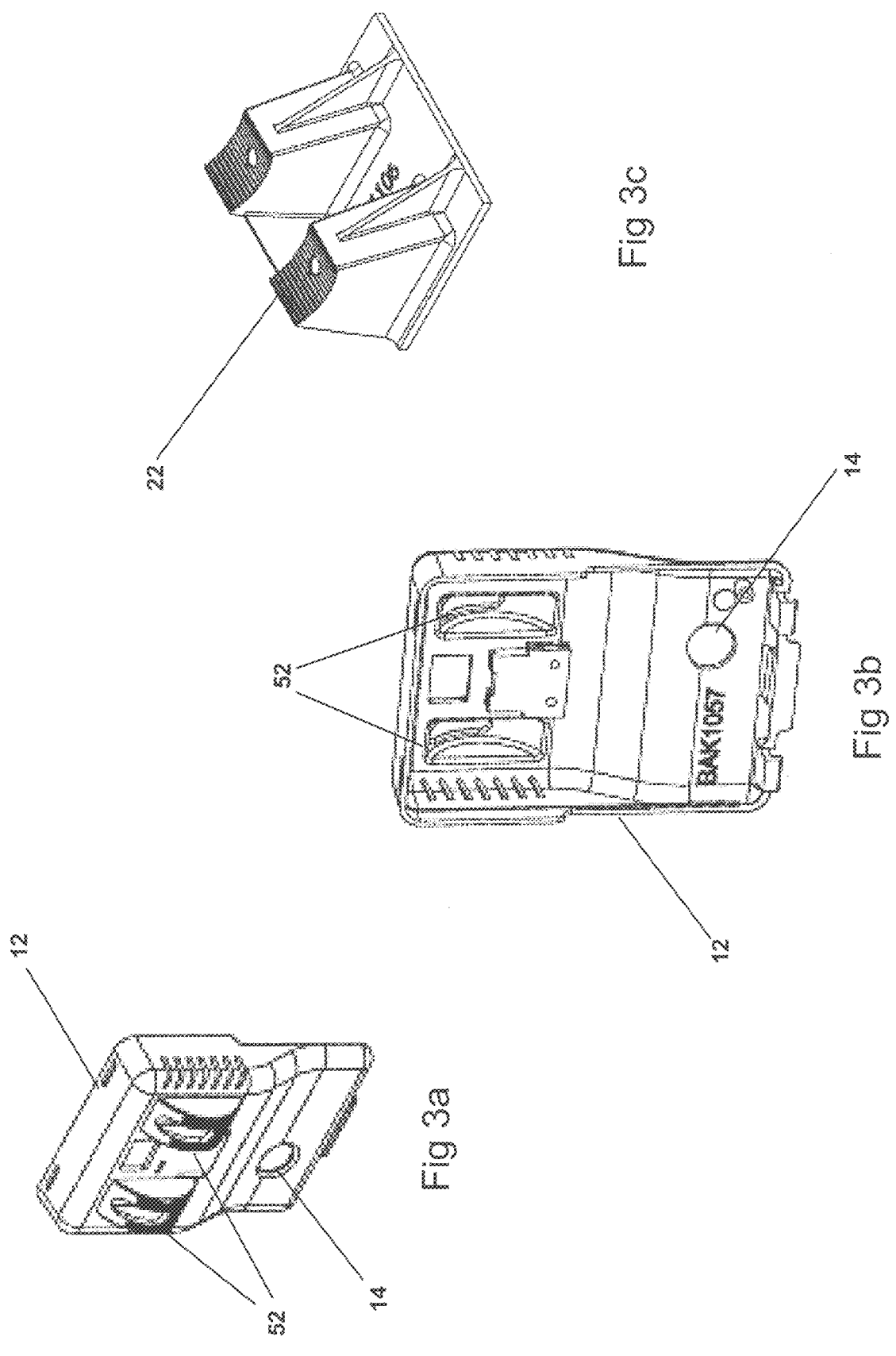
FIGS. 3a-e depict a front housing and adjustment mechanism according to one embodiment of a dual-camera system according to the present invention.

Referring to FIGS. 3*a-c*, one embodiment of the adjustment mechanism is depicted in greater detail. Front housing 12 is provided with two rotatable slots 52 that are slidingly and rotatably engaged within front housing 12. Each rotatable slot 52 is provided with holes through which screws 35 can be inserted and attached to mount 22. As described above, mount 22 may be rotated with respect to housing front 12 to allow the system 10 to be angled with respect to the surface upon which the system is mounted. The angle is fixed using pressure bushings 34. In FIG. 3*b*, a center tab or projection is used to fit within a slot configured in camera unit 36 shown in FIG. 2.

Figure 3E:
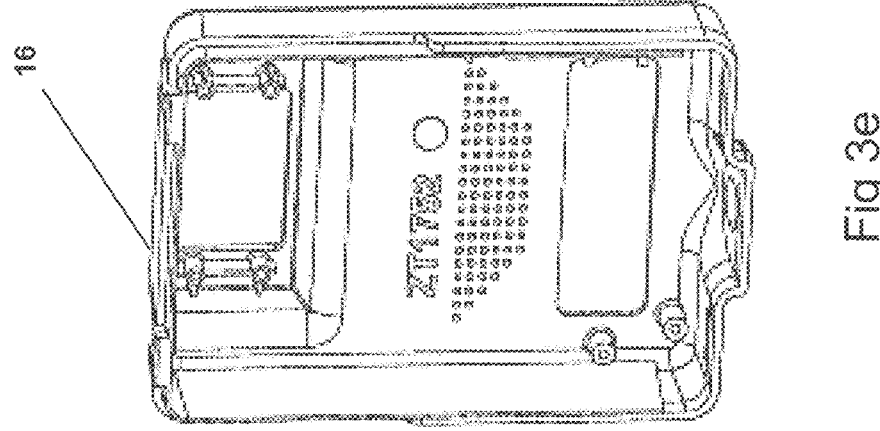
Figure 3D:
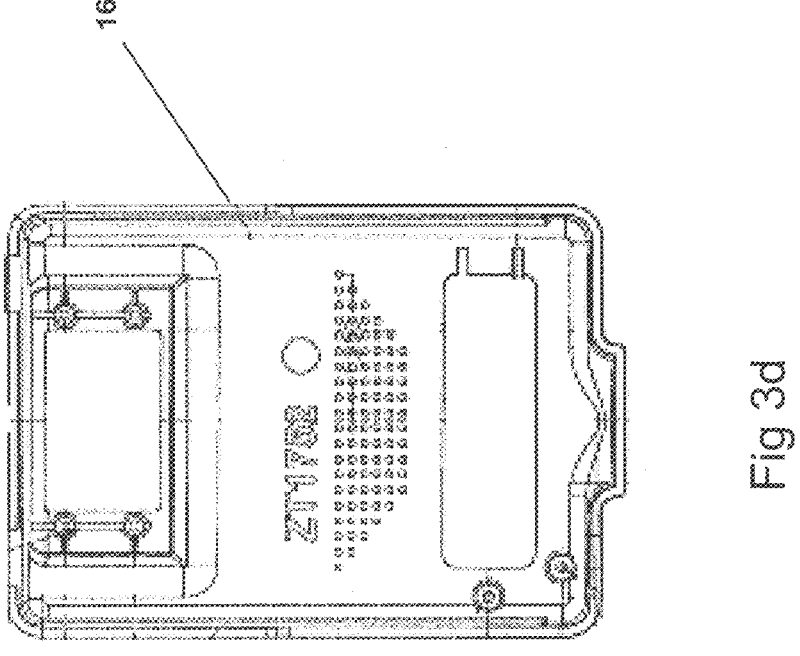

FIGS. 3*d-e* depict several views of one embodiment of the back housing 16 of the present invention.

Referring again to FIG. 2, camera 19 is protected by protective lens 40, which is held to back housing 16 by screw 38. In some embodiments, protective lens 40 is clear, which in other embodiments, protective lens may be provided with one or more filters to limit the light ranges provided to camera 19.

Back housing 16 and front housing 12 may be detachably connected using tabs 44 and slots 46 to enable the housings to be detached and provide access to the camera unit 36 and light source 18. In other embodiments, back housing 16 and front housing 12 may be connected using screws or rivets. A cam lock 42 is provided to prevent separation of back housing 16 and front housing 12 and to prevent access to camera unit 36. In at least one embodiment, the cam lock key cannot be detached once the removable housing has been open. This ensures that key(s) always stay with the housing and does not get lost.

In operation, dual-camera system is mounted in the interior of a vehicle to capture, for example, views of both the interior and exterior of the vehicle. FIGS. 4*a-c* depict alternate embodiments of a housing for the dual-camera system according to the present invention. As depicted in FIG. 4*a*, dual camera system 10 may be provided as part of a vehicle visor 60, which enables dual-camera system 10 simultaneous views of the interior and exterior of the vehicle. In alternative embodiments, dual-camera system 10 may be attached to visor 60 through clips, screws, adhesives, etc. As previously described, dual-camera system 10 is provided with an adjustment mechanism to allow the system 10 to remain vertical as the driver adjusts the visor.

As depicted in FIG. 4*b*, alternatively, dual-camera system 10 may be provided as part of a vehicle rearview mirror 70. As shown in FIG. 4*b*, first camera 15 is mounted on the back of the rearview mirror 70 to enable viewing towards the front of the vehicle. Second camera 19 is mounted on the back of rearview mirror 70 and is provided a view of the interior of the vehicle through a window or cutout in the rearview mirror. According to various embodiments, the window may be transparent or may be a one-way mirror to allow the camera a view of the interior of the vehicle without disturbing the reflective surface of the mirror. In alternative embodiments, when the cameras are integrated into the interior rearview mirror of the vehicle, a window in rearview mirror may be transparent, cutout or one-way mirror and allow an optional LED 74 and camera 19 to be viewed and/or for line of sight for viewing through the mirror. A single window/cutout/one-way mirror section or separate windows/cutouts/one way mirror sections may optionally be employed for the forward and rearward pointing cameras when both are used. When separate cameras are used, the second camera 15 may be mounted to the mirror back/support structure pointing forward.

Figures 6A, 6B, 6C:
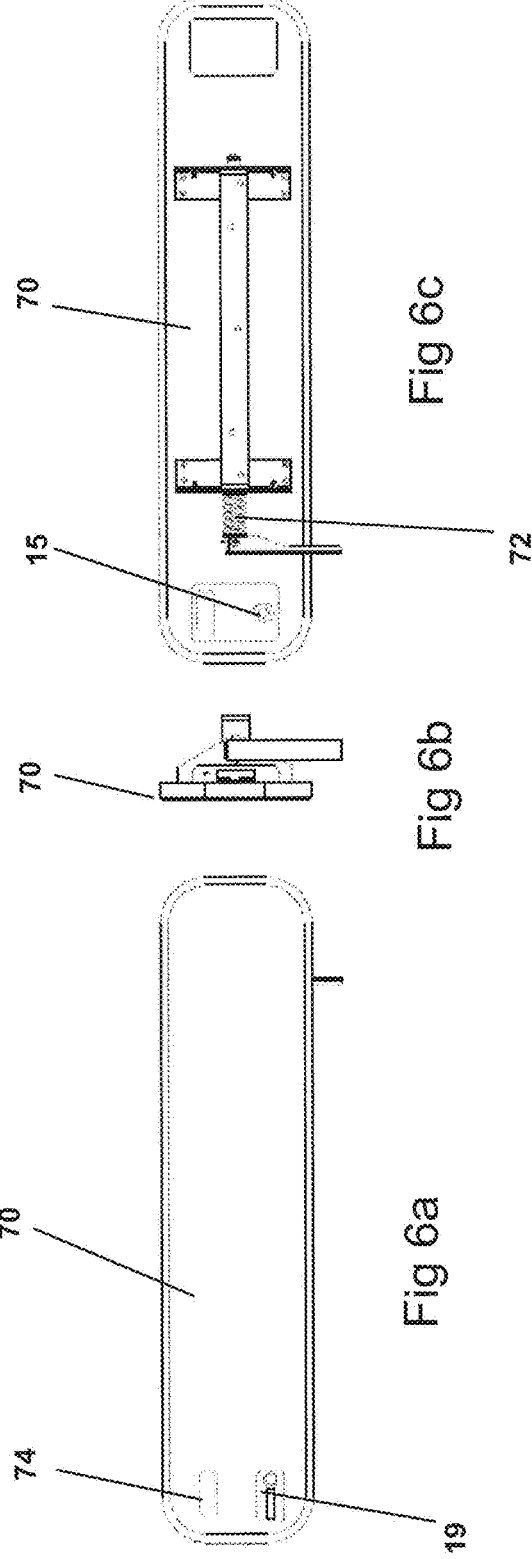
FIGS. 6a-c depict an embodiment of a dual-camera system according to the present invention wherein the dual-camera system is contained in a rearview or other similar mirror.

As illustrated in FIGS. 6*a-c*, cameras may be mounted in rearview mirror 70 with rivets, or adhesive directly to the mirror back/support structure, optionally with an adjustment mechanism 72 such as a pivot or ball and socket structure for 2-dimensional or 3-dimensional standard adjustment mechanisms. Alternatively, a pocket may be provided in the rearview mirror 70 that accepts the camera after which it is riveted or adhered, for example, via adhesive in place. The pocket itself may be riveted, affixed via adhesive, injection molded with an optional seamless construction of, for example, injection molded plastic and/or stamped using a steel construction to the rear-view mirror back/support structure. In alternative embodiments, the camera(s) may be provided with a flange that is accepted by the shape of the pocket. The flange then being fixed/riveted in place.

In alternative embodiments, when one or two cameras are mounted or integrated with the interior rearview mirror 70, monitor 80 and/or on visor 60, the cameras may optionally include a standard motor driven and/or automated self-leveling mechanism or may be manually leveled to assist the correct viewing angle of the cameras in the event the visor, rearview mirror 70 and/or monitor 80 are moved or adjusted within the vehicle.

Figure 4D:
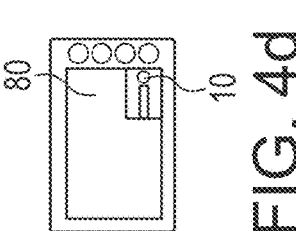
FIGS. 4a-d depict various embodiments of a dual-camera system according to the present invention.
Figure 4C:
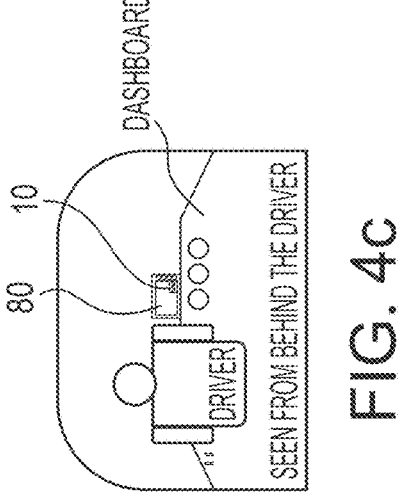
Figure 4B:
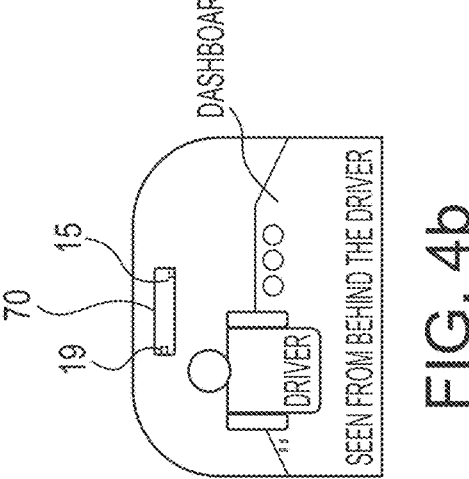
Figure 4A:
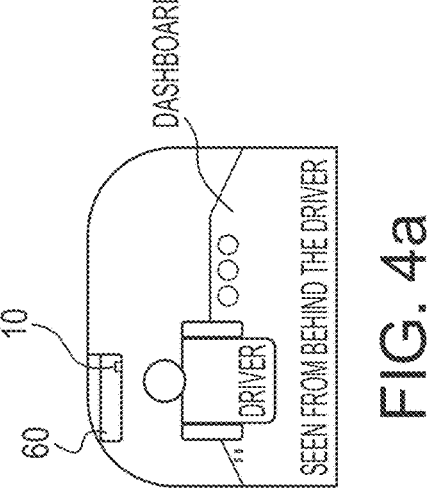

In alternative embodiments, the housing used for the present invention, as illustrated in FIGS. 4*c-d*, advantageously includes the dual camera system 10 integrated into a monitor 80. The monitor 80 may already be used for viewing video being taken behind the vehicle during reverse operation. In this embodiment, the monitor has an additional input that can be used for real-time monitoring of the interior of the vehicle when not in reverse using the integrated camera (and/or additional camera mounted or connected to the monitor pointing toward the passenger area of the vehicle).

The invention can advantageously be used in alternative embodiments for real-time play back of recorded video for the driver to see the passenger area without turning his/her head backward. This feature advantageously permits playing back of real-time video (as described above) for the benefit of the driver or a manager in the vehicle without having to remove the SD card and without loading the SD card into an additional device because the cameras are integrated with the monitor. An example of a camera that is integrated into a monitor can be, for example, a laptop computer monitor, a computer monitor, a television monitor, and the like. In alternative embodiments, an additional camera can be integrated into the monitor for recording events in the forward direction which the driver does not need to see in real-time.

In alternative embodiments, the monitor may be connected to a camera that views the front of the vehicle to detect, for example, children in front of the vehicle. The camera could be connected to the vehicle computer (in addition to the monitor) that would prevent the vehicle from moving forward in the event an object is detected. An optional override switch would be available in the event of a malfunction to allow the bus to operate under normal conditions. Examples of an integrated monitor and camera than can be used is, for example, ATV M201SB-WDR Public 20.1" LCD Monitor With Integrated Camera and the Dell SP2008WFP 20-Inch Monitor With Built-In Camera. These monitors are optionally and advantageously modified as described above to have an additional camera mounted to or integrated therein pointing forward as well.

Figure 5A:
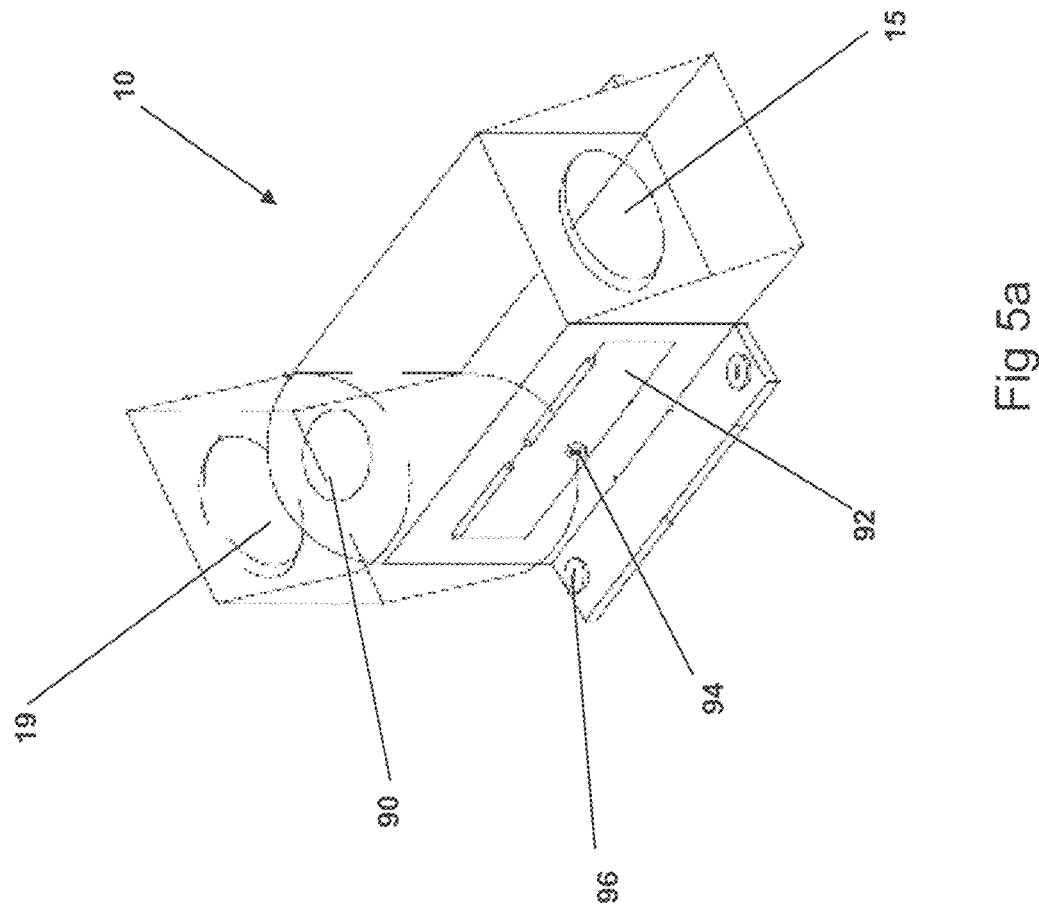
FIGS. 5a-d depict an embodiment of a dual-camera system according to the present invention providing a pivot to angle a camera.
Figure 5D:
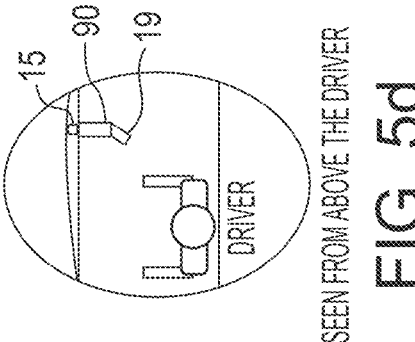
Figure 5C:
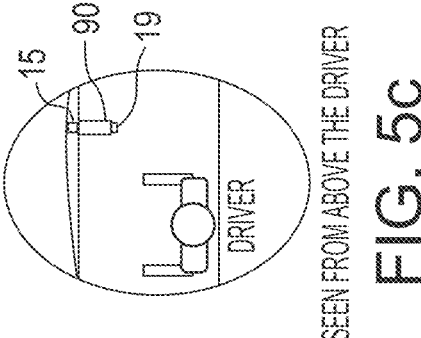
Figure 5B:
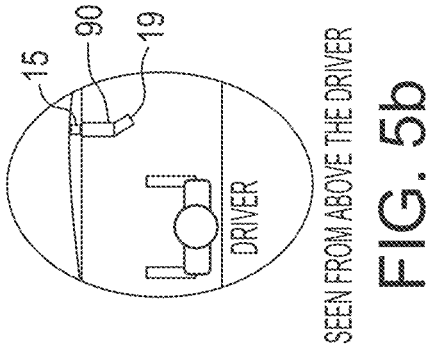

In alternative embodiments, the dual-camera system 10 may be mounted on a dashboard of a vehicle where at least one of the camera may be rotated to change the angle of view provided to the camera. For example, referring to FIG. 5a, an embodiment of a dual-camera system 10 with a rotatable camera is depicted. A first camera 15 is angled in the direction of travel of the vehicle, whereas a second camera 19 may be angled to change the view of the camera of the interior of the vehicle. Dual-camera system 10 is provided with a pivot 90 that may be adjusted to rotate the angle of view of the second camera 19. According to various embodiments, the pivot 90 may be motorized to allow electronic adjustment of the camera, whereas in other embodiments, the pivot may be adjusted manually. One or more screws or rivets 96 are provided to secure the system 10 to a dashboard or other suitable surface providing appropriate views to both cameras. A hinged door 92 provides access to the housing to allow replacement of components and removal of storage media for playback of stored audio and/or video on an external device. A cam lock 94 is provided to secure the hinged door 92 and restrict access to authorized personnel. As shown in FIGS. 5b-d, in operation, the second camera 19 can be angled using the pivot 90 to face a door of the vehicle, may be pointed towards the rear of the interior of the vehicle or may be pointed towards the driver. According to some embodiments, the angle of the pivot 90 may be locked to prevent the driver from changing the angle of the second camera 19.

Figure 7:
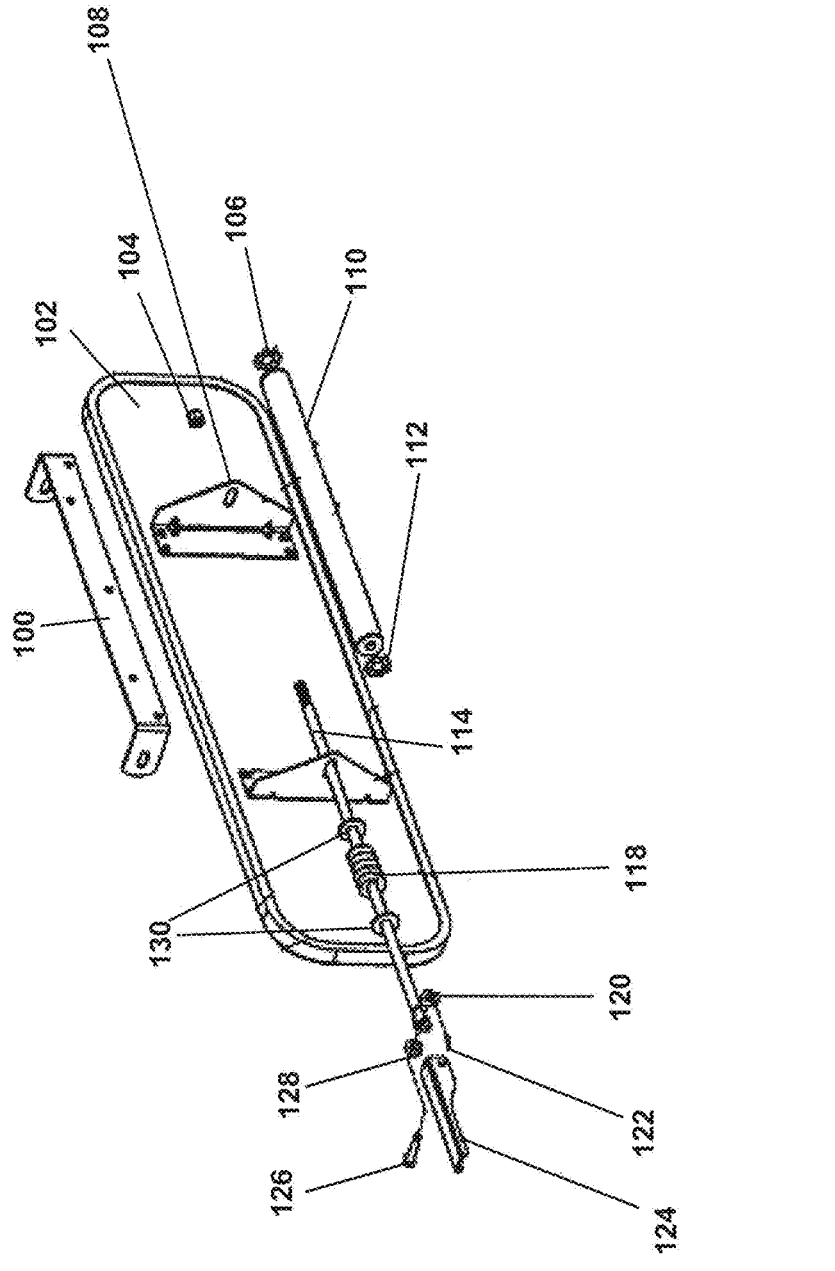
FIG. 7 is a schematic illustration of a perspective view of various components of the locking mechanism for a mirror according to an aspect of the present disclosure.

In some embodiments, an optional lever lock mechanism can be used to lock the rear-view mirror in place in the vehicle as currently offered by Rosco, Inc. of Jamaica, NY and the assignee of the present application. According to one embodiment, FIG. 7 depicts parts of the interior mirror assembly's locking mechanism 102, including the fixed mounting bracket 100 attached to the interior of vehicle and the shaft with a threaded end 114 that is passed through or positioned in L-bracket 116 and L-bracket 108.

A helical compression spring 118 is slid onto shaft 114 and flat washers 130 are positioned on either end of helical compression spring 118. Also, tubular sleeve 110 is positioned around shaft 114 between L-bracket 116 and L-bracket 108. Shaft 114 is secured into place using lock nut 104 on the outside of L-bracket 108 (on the side of the L-bracket 108 facing away from L-bracket 116). Also, lock washer 112 and lock washer 106 may be positioned on either side of tubular sleeve 110 between L-bracket 116 and L-bracket 108. Shaft 114 is also passed through both sides of fixed mounting bracket 100. That is, one end of fixed mounting bracket 100 may be positioned between tubular sleeve 110 and L-bracket 116 and the other end of fixed mounting bracket 100 may be positioned between the other end of tubular sleeve 110 and L-bracket 108.

Handle 124 may be positioned on an end of shaft 114 and secured thereto using clevis pin 126 and spacer 128 and spacer 120 on either end of clevis pin 126. Also, cotter pin 122 may be positioned on an end of clevis pin 126 to secure it in place inside handle 124. It will be understood that, while particular components of locking mechanism 102 are described herein, various parts may be omitted, or may be combined and formed integrally, or the parts may be arranged in different ways without departing from the spirit of the present disclosure. For example, while helical compression spring 118 is described, it will be appreciated that other types of springs or non-spring urging members may be used to apply pressure to L-bracket 116 as described below; or, while mounting brackets 100 is described as being attached to the inside of vehicle 10, other types of fasteners may be used to secure mirror 20 or locking mechanism 102 to vehicle 10.

Figures 10A, 10B, 10C:
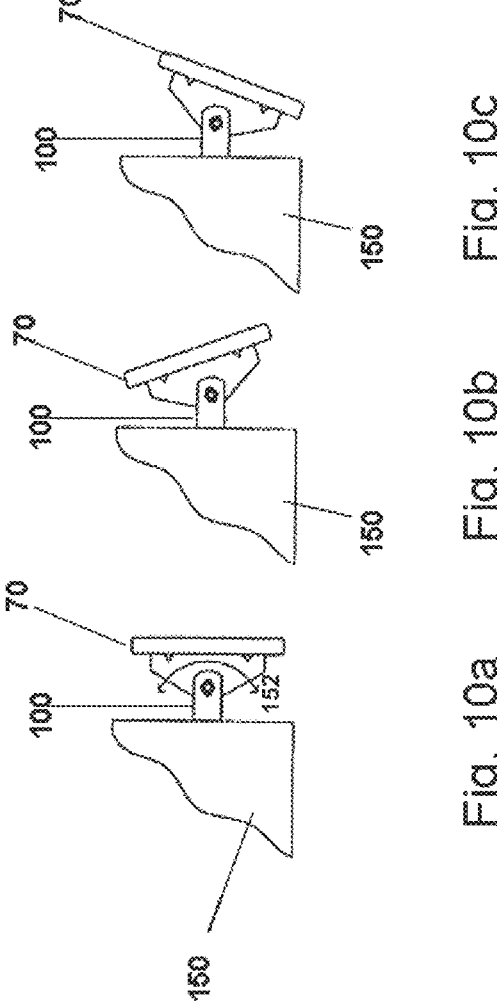
FIGS. 10a-c are schematic illustrations of a side view of a mirror and a mounting bracket.

FIG. 10a shows mirror 70 in a vertical position in relation to header panel 150 behind the mirror and the mirror assembly with fixed mounting bracket 100 connecting mirror assembly 40 and header panel 150. FIG. 10a also includes arrow 152 which shows the adjustable positions of mirror 20 in an unlocked position. FIG. 10b shows mirror 70 tilted up and FIG. 10b shows mirror 70 tilted down.

Figure 9:
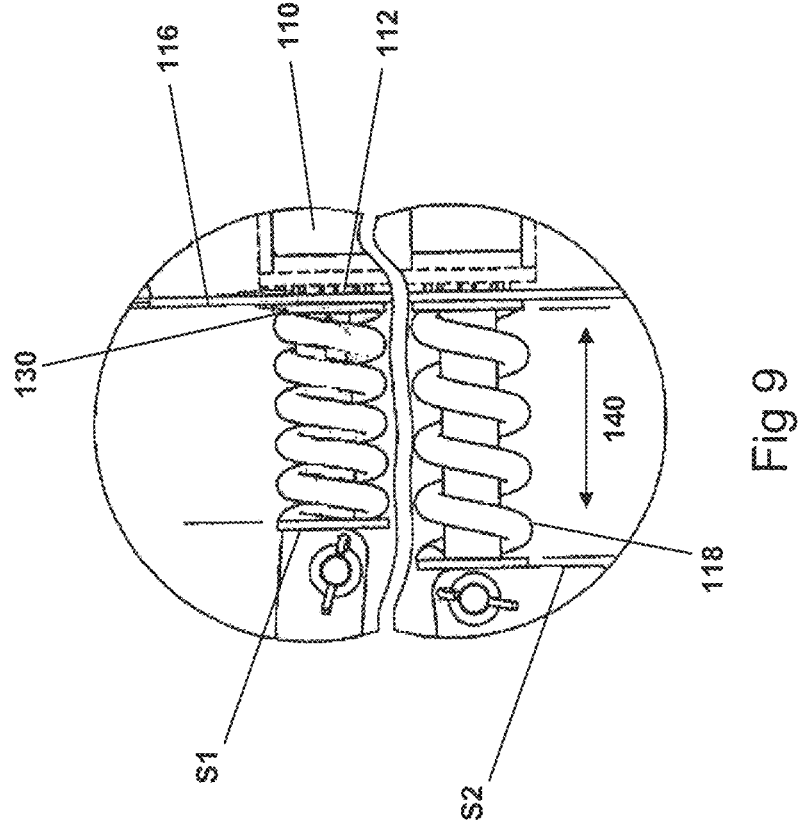
FIG. 9 is a schematic illustration of a close-up view of a spring of the locking mechanism shown in both a compressed state and a decompressed state according to an aspect of the present disclosure.

FIG. 9 shows compression spring 118 in a compressed state (top portion) in which compression spring 118 applies a pressing force to L-bracket 116, which in-turn applies a force to mounting bracket 100 and thus creates friction between L-bracket 116 and mounting bracket 100, and between mounting bracket 100 and L-bracket 108 positioned on the other side of mounting bracket 100 from L-bracket 116. Lock washer 112 is provided to create engagement between L-bracket 116 and mounting bracket 100. That is, as shown in FIG. 4, a spring gap 138 exists between surface S1 on a proximal end of handle 136 and a fixed surface 134 such as L-bracket 116 positioned on the rear side of the mirror, in which spring gap 138 compression spring 118 is positioned.

Figure 8:
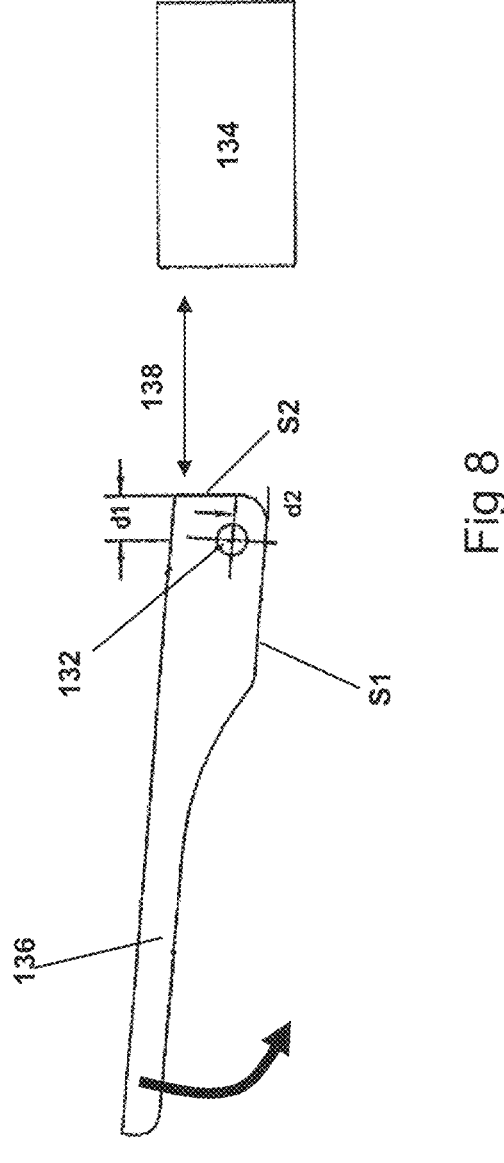
FIG. 8 is a schematic illustration of a front view of a handle and a spring gap of the locking mechanism according to an aspect of the present disclosure.

Shown on the lower portion of FIG. 8 is handle 136 moved or rotated to a releasing position (as indicated by the curved arrow), such that surface S2 is the surface of handle 136 that faces spring gap 138 so that spring gap 138 is larger than spring gap 140 because of the cam-like geometry of handle 136. Accordingly, since compression spring 118 is accommodated in spring gap 138 without substantial compression of the spring, the pressure applied to fixed surface 134, such as by L-bracket 116 on the other side of spring gap 138 is reduced or eliminated so that the mirror can be easily or more easily tilted, moved or otherwise adjusted.

Figures 11A, 11B:
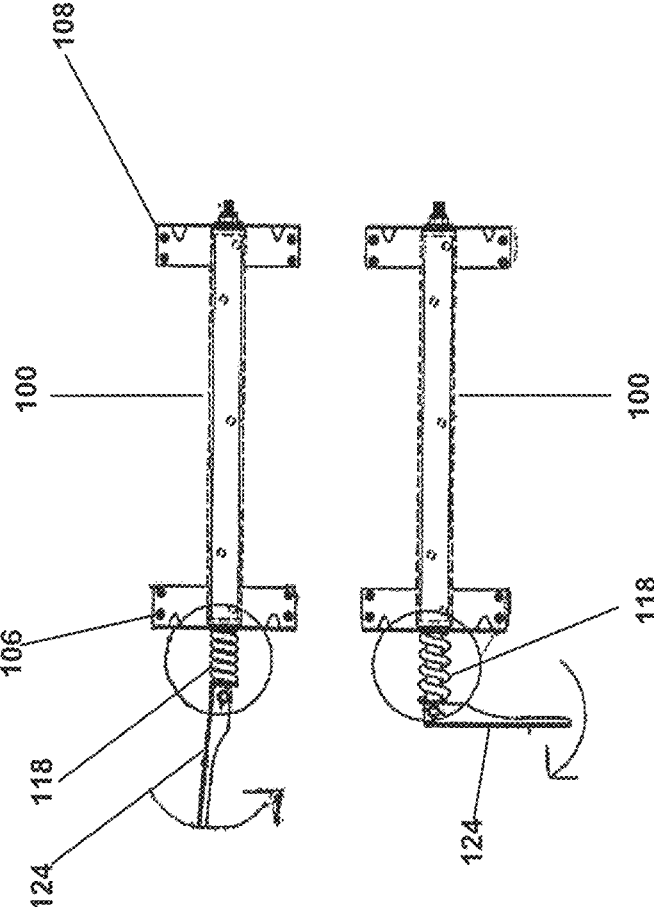
FIGS. 11a-b are schematic illustrations of the locking and released positions of the handle of the locking mechanism according to an aspect of the present disclosure.

FIG. 11a shows an exemplary embodiment of handle 124 according to which the smaller spring gap 140 is provided when handle 124 is in a substantially horizontal position, so that the area closest to spring gap 140 and spring 118 is surface S1, and compression spring 118 is compressed in a locking position. FIG. 11A also shows arrow 154 which shows the direction in which, according to the illustrated embodiment, handle 124 is moved to release locking mechanism 102.

As shown in FIG. 11b, handle 124 in the embodiment illustrated is in a substantially vertical position to provide the larger spring gap 138 shown in the lower portion of FIG. 9. In this position, surface S2 of handle 124 is the portion of handle 124 that is closest to spring gap 138 and compression spring 118. FIG. 8 shows distance d1, which is the length by which spring gap is decreased in the locking position locking mechanism 102 because surface S1 of handle 124 is closer to fixed surface 134 than is surface S2 because of the cam-like geometry of the top portion of handle 124.

While handle 124 is shown as being in a locking position when in a substantially horizontal position, it will be understood that if the cam-like portion of the handle is shifted 90 degrees, then the horizontal position may be the releasing or unlocking position of locking mechanism 102 and the vertical position may be the locking position by which compression spring 118 or other urging member is pressed forward to lock locking mechanism 102.

Also, while the unlocking position of the handle is shown as the handle pointing down, it will be appreciated that if the cam-like portion of the handle is positioned differently, then the lever may he moved to the locking position by moving the lever up 90 degrees. Also, while lever 124 is shown as being in the locking position or the unlocking position by a 90-degree movement of lever 124, if the cam-like portion of lever 124 is altered so that surface S2 and surface S1 are positioned substantially 45 degrees in relation to one another, then handle 124 may be alternated between the locking position and the unlocking position via a 45 degree movement. Other similar greater or lesser angles are also contemplated.

According to various embodiments of the present invention, system diagnostics may be performed using an incorporated multi-segment LED display. For example, after power has been supplied to the dual camera system 10, a chime may be heard if the SD card or memory is absent. In addition a message, such as "ErrSd" may be displayed on the LED display. In the event of a GPS update error the LED may display another message, such as "Err0." During operation, the system may provide audio cues to indicate proper function. For example, the system may chime once at the time of a recording event, the system may chime twice if the number of recording events exceeds a predetermined threshold (e.g., 5 recording events), the system may chime three times if the memory is full and no longer capable of recording additional recording event. In addition the LED display may provide visual messages in response to recording events, for example, a counter indicating the number of recording events captured, the number of each type of recording event that has been captured, or a message such as "FULL" indicating that the memory capacity of the storage device has been met or exceeded.

Audio and/or video files may be viewed by authorized personnel via an associated monitor or the memory storage device, e.g., SD memory card, may be removed from the system 10 to allow the audio and/or video to be viewed on an external device such as a personal computer or dedicated playback device. In alternative embodiments of the present invention video or parameter associated with stored video can be read these parameters without removing the SD card, via a cellular data or WiFi network. In certain embodiments, software is provided to allow viewing of pertinent information related to both cameras, such as video captured by each camera, the speed of the vehicle at the time of capture, the direction of the vehicle at the time of capture, etc. The software allows a user to fast forward video from one or both cameras, rewind video from one or both cameras, pause video from one or both cameras, view video from one or both cameras in slow motion, etc.

Figure 12B:
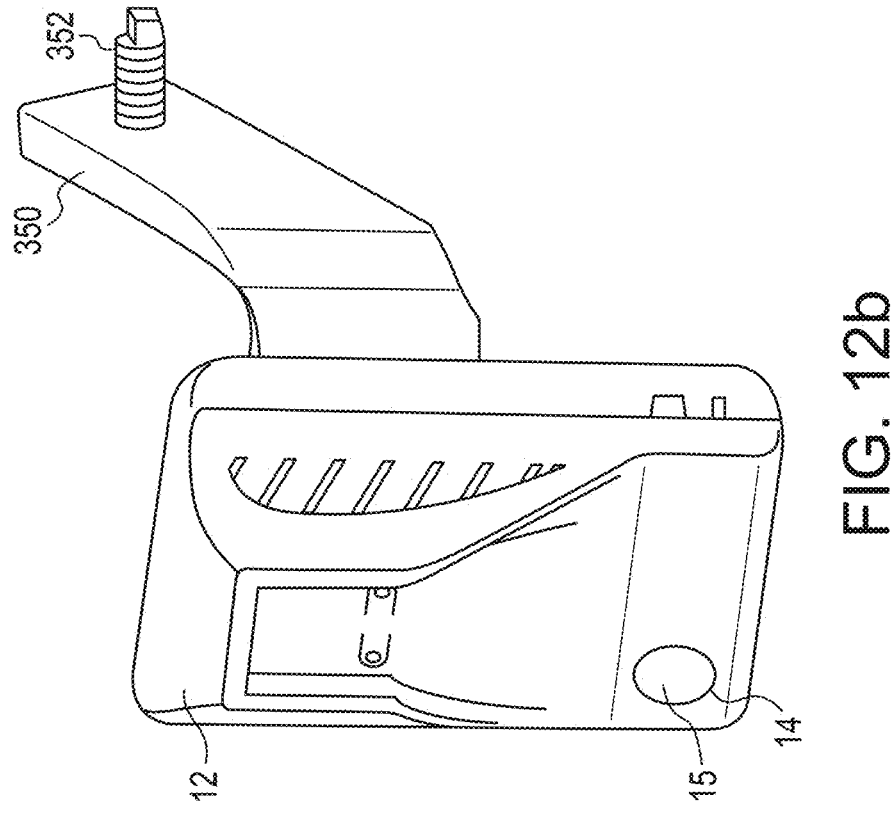
FIGS. 12a and 12b depict an embodiment of a dual camera system configured to be attached to an A-frame of an automobile according to one embodiment of the present invention.
Figure 12A:
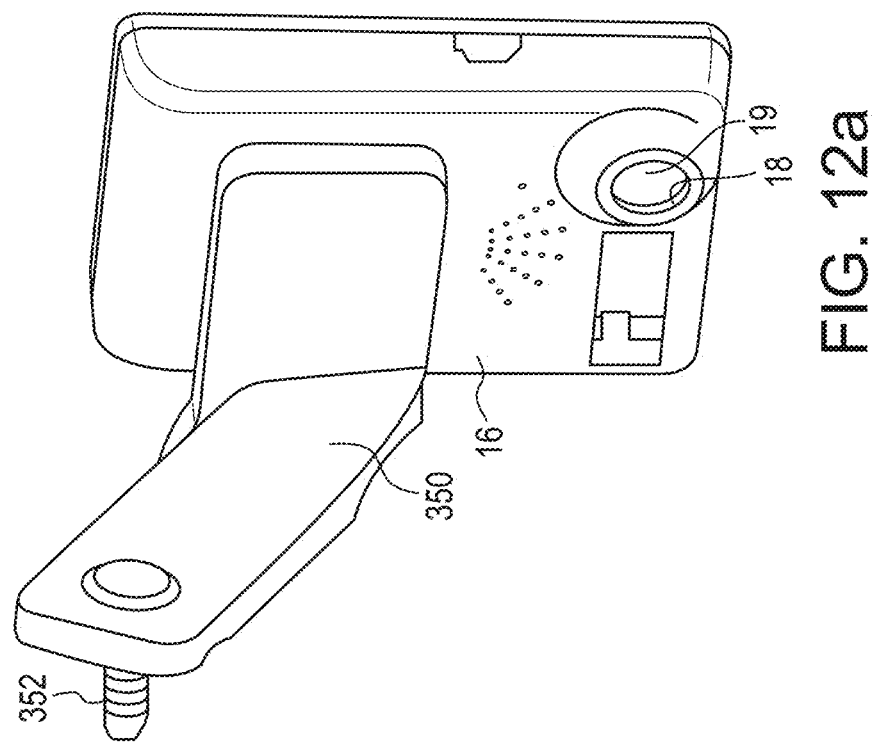

Referring to FIGS. 12a and 12b, an alternative embodiment of a dual camera system according to the present invention. As depicted the dual camera system is a provided with a bracket 350 to enable the dual camera system to be connected to an A-frame of a vehicle. The bracket 350 may be connected to the vehicle A-frame by one or more bolts

352 or rivets. According to various embodiments, the dual camera system may be attached to the bracket 350 by screws or rivets to prevent removal of the system from the vehicle by unauthorized personnel. In alternative embodiments, the dual camera system may be received by a slot in bracket 350 that allows the system to be slid into position. In embodiments wherein the dual camera system is received by a slot, the dual camera system may be secured by screws to prevent the system from inadvertently leaving the slot in the event of a jolt to the vehicle. In other embodiments, the dual camera system may be secured to the bracket 350 by a lock to prevent unauthorized removal or tampering with the system.

Figure 12C:
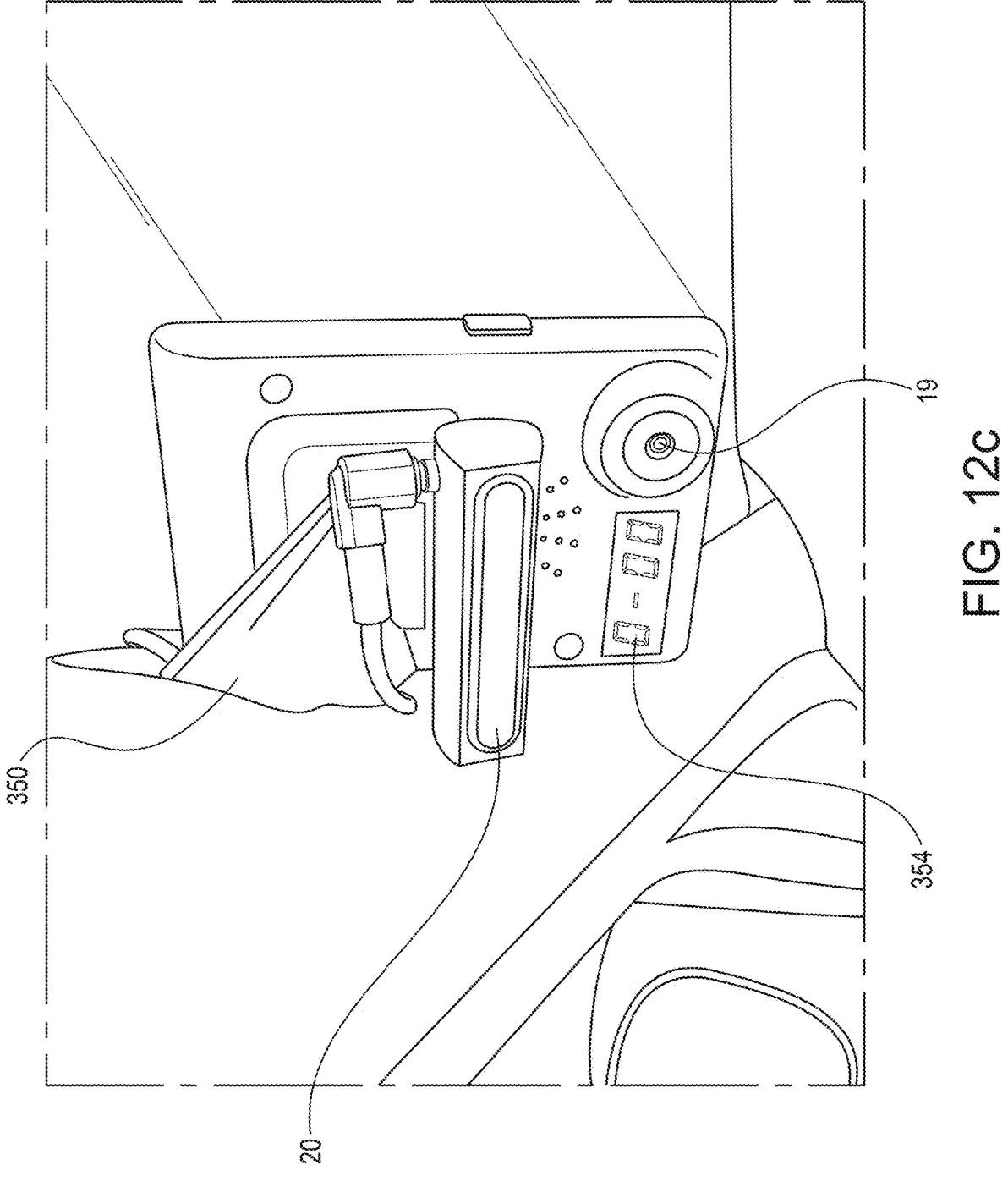
FIG. 12c is a photograph of an embodiment of a dual camera system configured to be attached to an A-frame of an automobile according to one embodiment of the present invention.
Figure 12D:
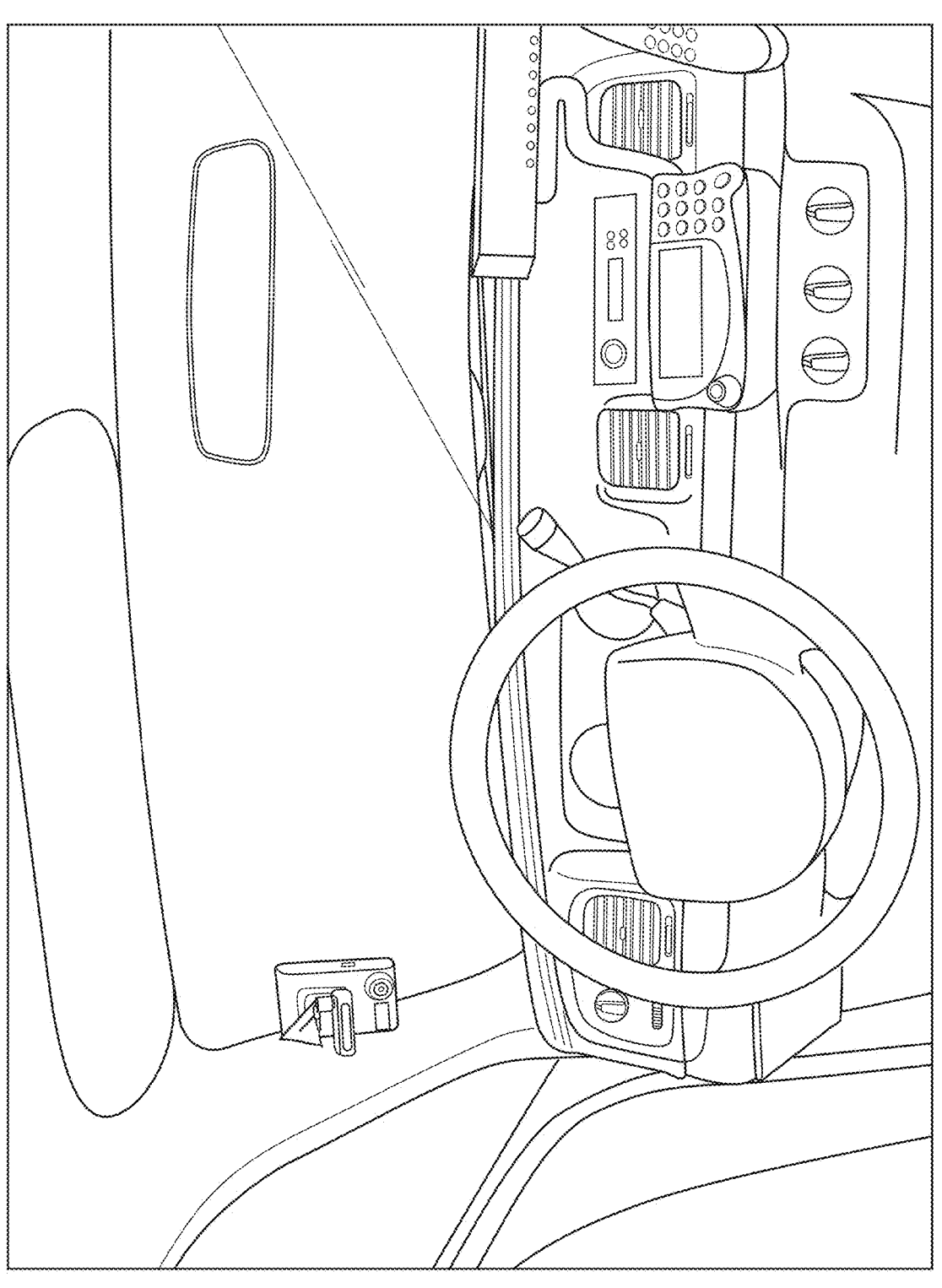
FIG. 12d is a photograph of another view of an embodiment of a dual camera system configured to be attached to an A-frame of an automobile according to one embodiment of the present invention.

As shown in FIGS. 12c and 12d, the dual camera system may be attached to the A-frame of a vehicle such as a taxi or other livery vehicle to monitor the interior of the vehicle as well as the exterior of the vehicle during operation. In various embodiments, a removable light source 20, such as an LED light source may be provided to illuminate the interior of the vehicle during operation of the system in low light conditions. In some embodiments, the LED light source 20 provides illumination using an infra-red wavelength to prevent distracting the driver. A counter 354 is provided to indicate the number of occurrences each type of event.

Figure 13A:
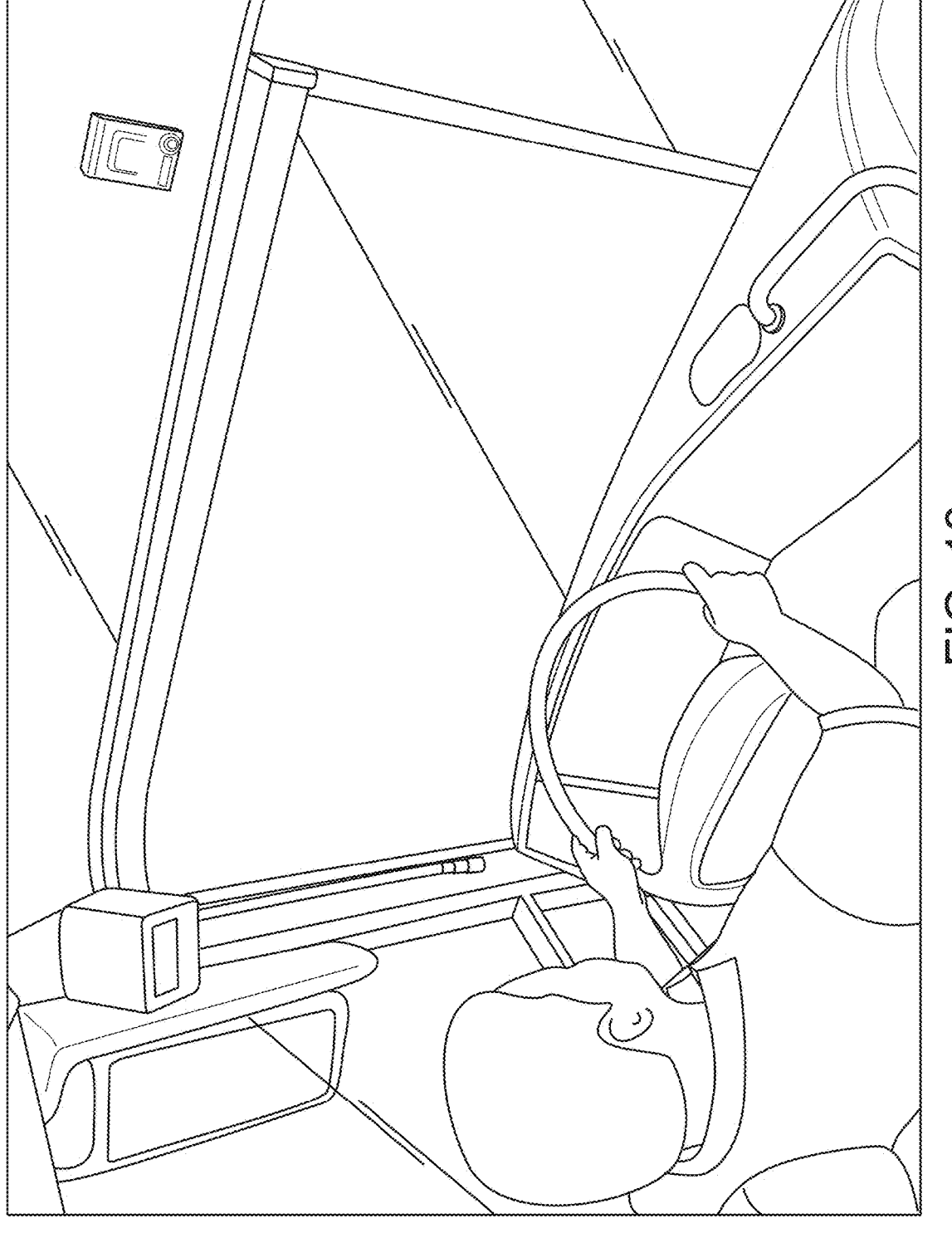
FIGS. 13a-c are photographs of a dual camera system mounted to a windshield of a bus according to one embodiment of the present invention.
Figure 13B:
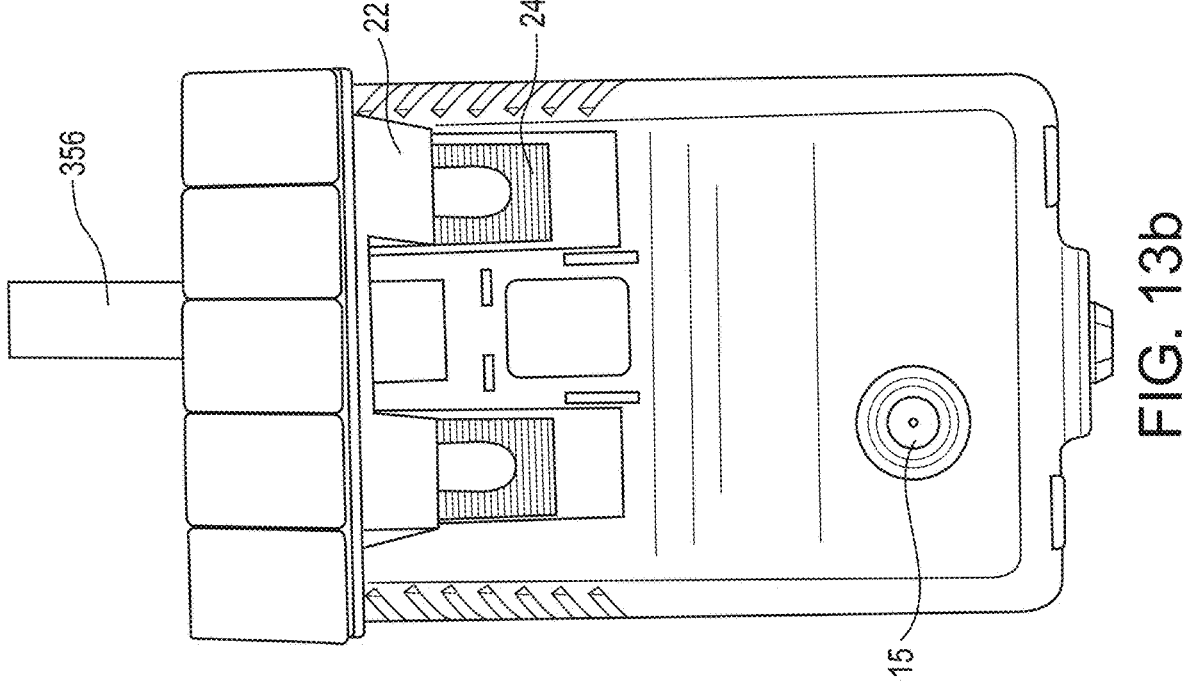
Figure 13C:
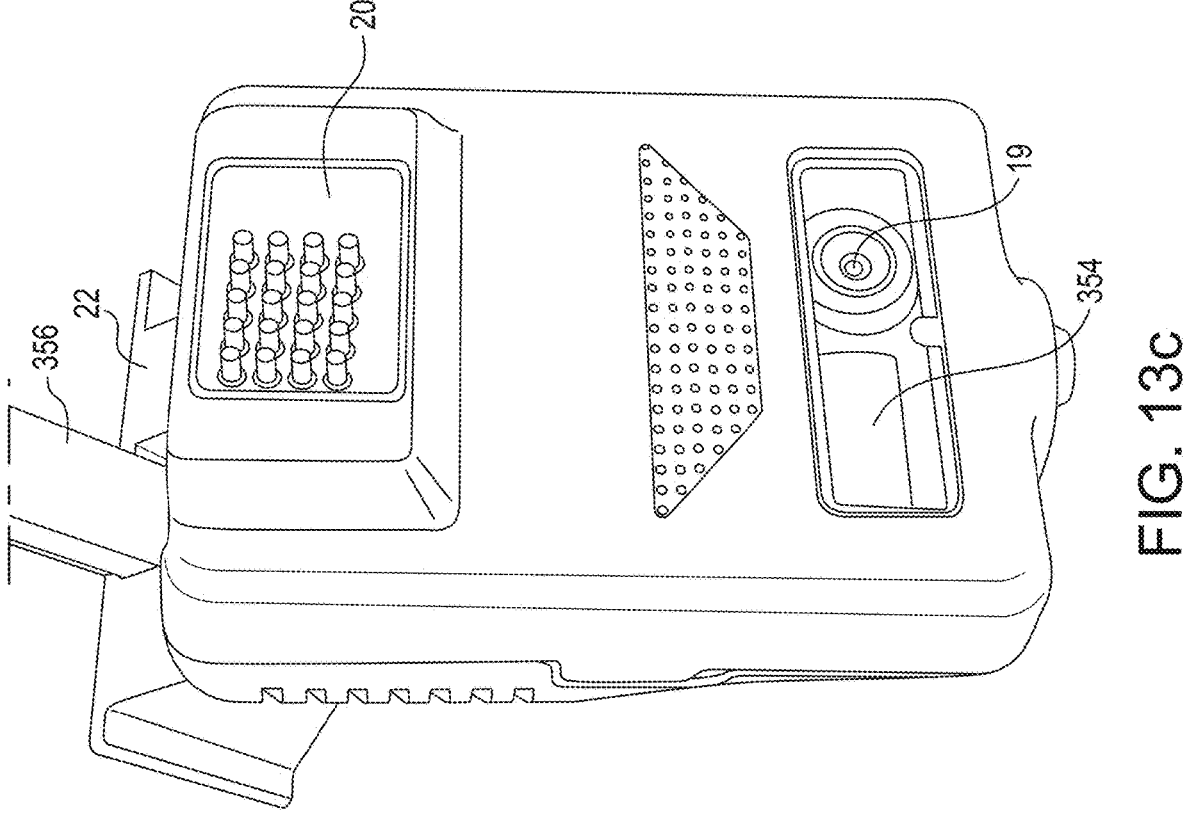

Referring to FIG. 13a-c, an alternate embodiment of the present invention is depicted. As shown, the dual camera system is provided with permanent double-sided tape to allow the system to be mounted to the windshield of a bus or other similar vehicle, such as a tractor, semi, etc. It will be appreciated that the dual camera system may be affixed to the windshield by other appropriate means, such as glue, epoxy, etc. In certain embodiments, a conduit 356 is provided for a wire harness to conceal exposed wires and to prevent sabotage or vandalism by cutting the wires. The conduit 356 may be affixed to the windshield by dual-sided tape, glue, epoxy or other appropriate means. FIG. 13b illustrates the dual vision system being affixed directly to the windshield using the windshield mount without using the protective enclosure, whereas FIG. 13c illustrates the dual vision system affixed to the windshield using the protective enclosure system embodiment of the present invention.

Figures 14A, 14B:
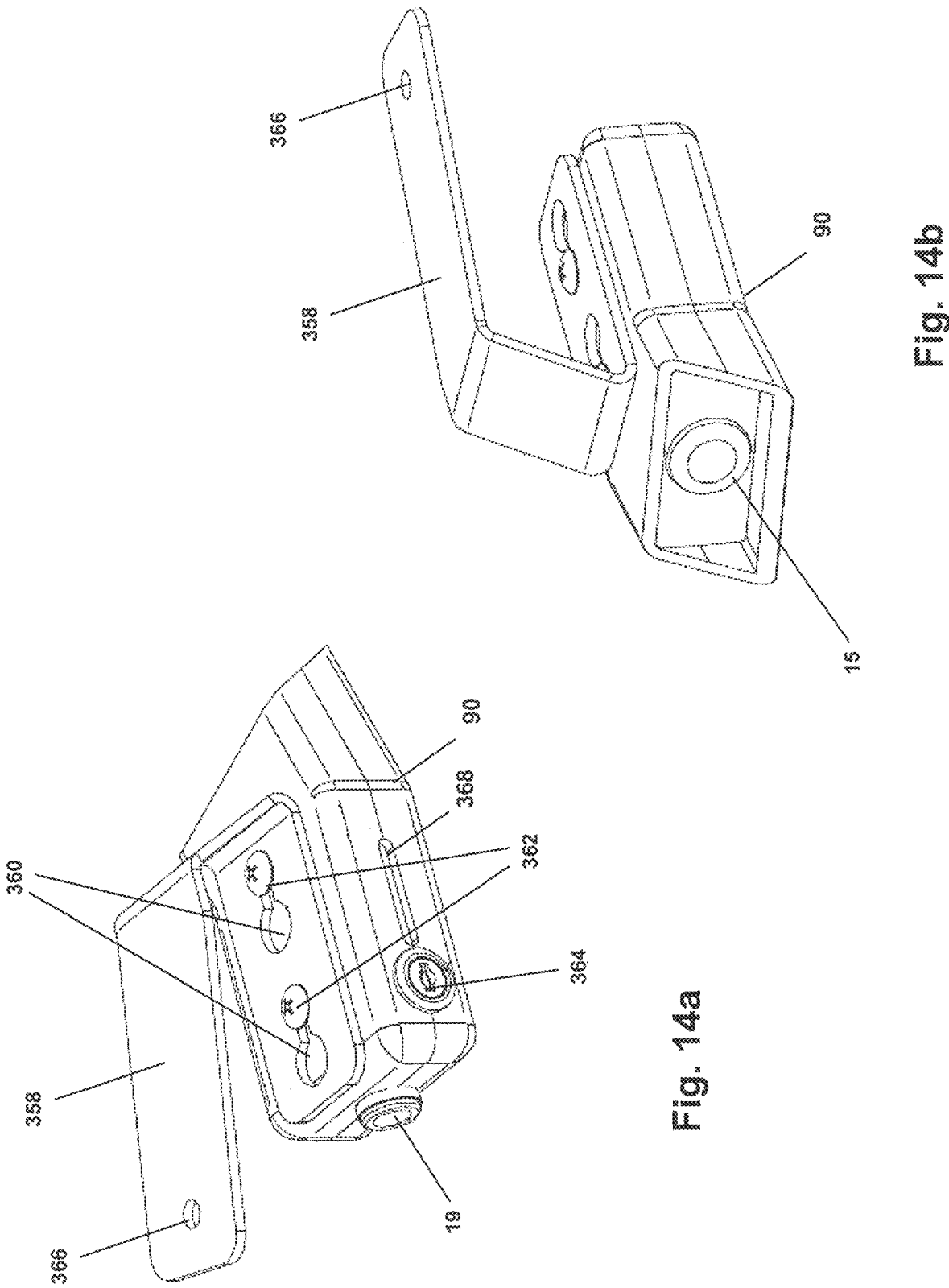
FIGS. 14a and 14b depict alternative views of an embodiment of the present invention configured to be mounted to a vehicle ceiling.

Referring to FIGS. 14a and 14b, an alternate embodiment of the present invention is depicted. As shown, dual camera system is provided with a bracket 358 that may be used to connect the system to the roof of a vehicle. In some circumstances, the bracket may be used to take advantage of existing hardware in the vehicle, for example, visor support brackets. Bracket 358 is provided with at least one hole 366 through which screw, bolt, peg or rivet may be placed to secure the bracket to the vehicle. Bracket 358 is provided with one or more slots 360 to connect the bracket to the dual camera system. Slots 360 may receive a peg or screw 362 in place on the dual camera system, after which the system is secured to the bracket 358 by sliding system into a locked position. The system may be additionally secured by tightening the screws after the system has been placed in the locked position.

The dual camera system is provided with a pivot 90 that allows the angle of the forward looking camera 15 to be adjusted. A cam lock 364 is provided to secure access to the SD card access slot 368. As will be understood, the cam lock 364 may be rotated to block the SD card access slot 368 and prevent unauthorized removal or tampering with the SD memory card. In alternative embodiments, the pivot 90 is not adjustable but pre-formed to include a predetermined angle that can be used, for example, to direct the line of sight toward the driver or other location in the vehicle, as illustrated in, for example, FIGS. 5b-5d.

Figure 15:
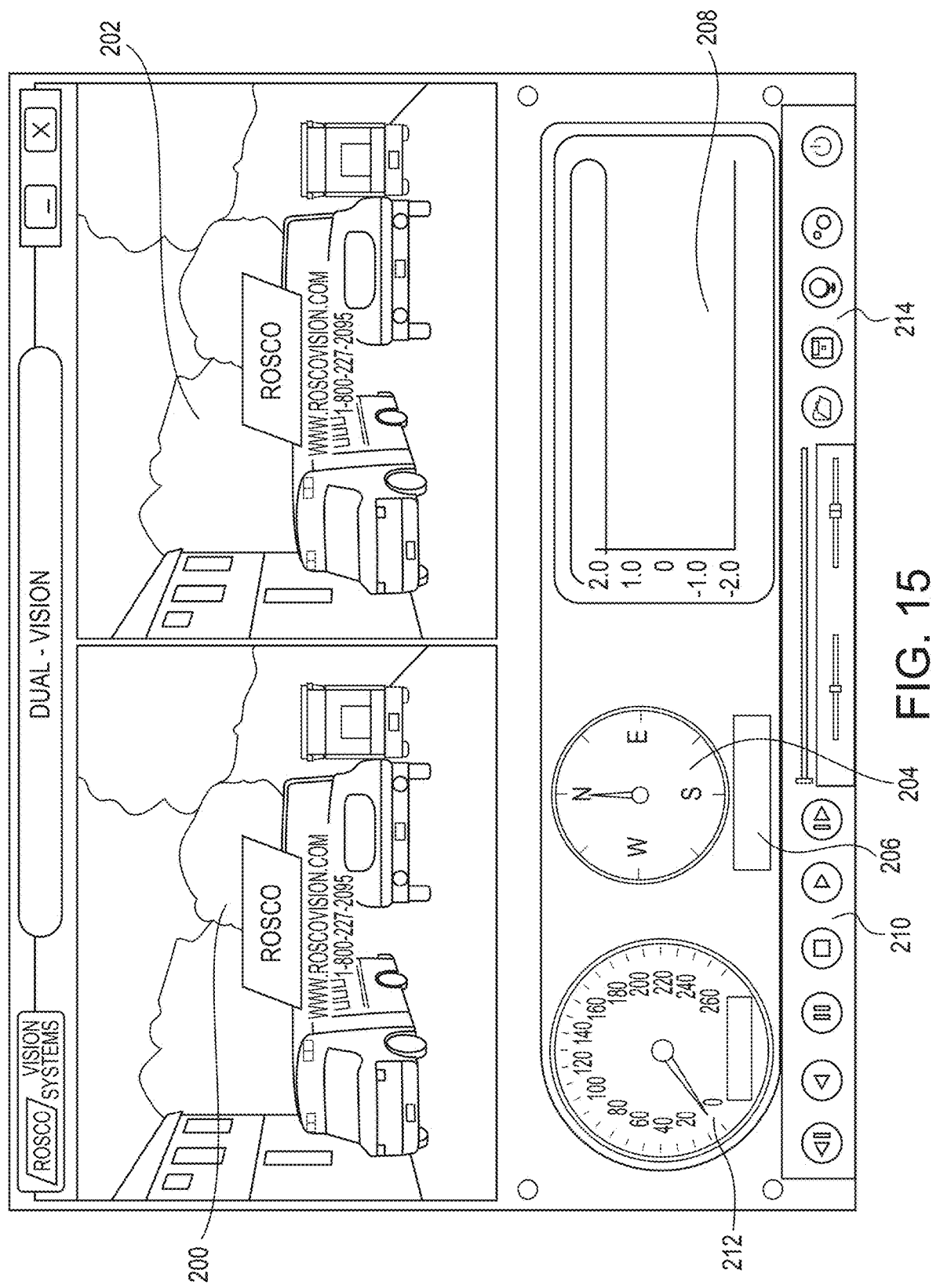
FIG. 15 depicts viewing software according to one embodiment of the present invention.
Figure 17A:
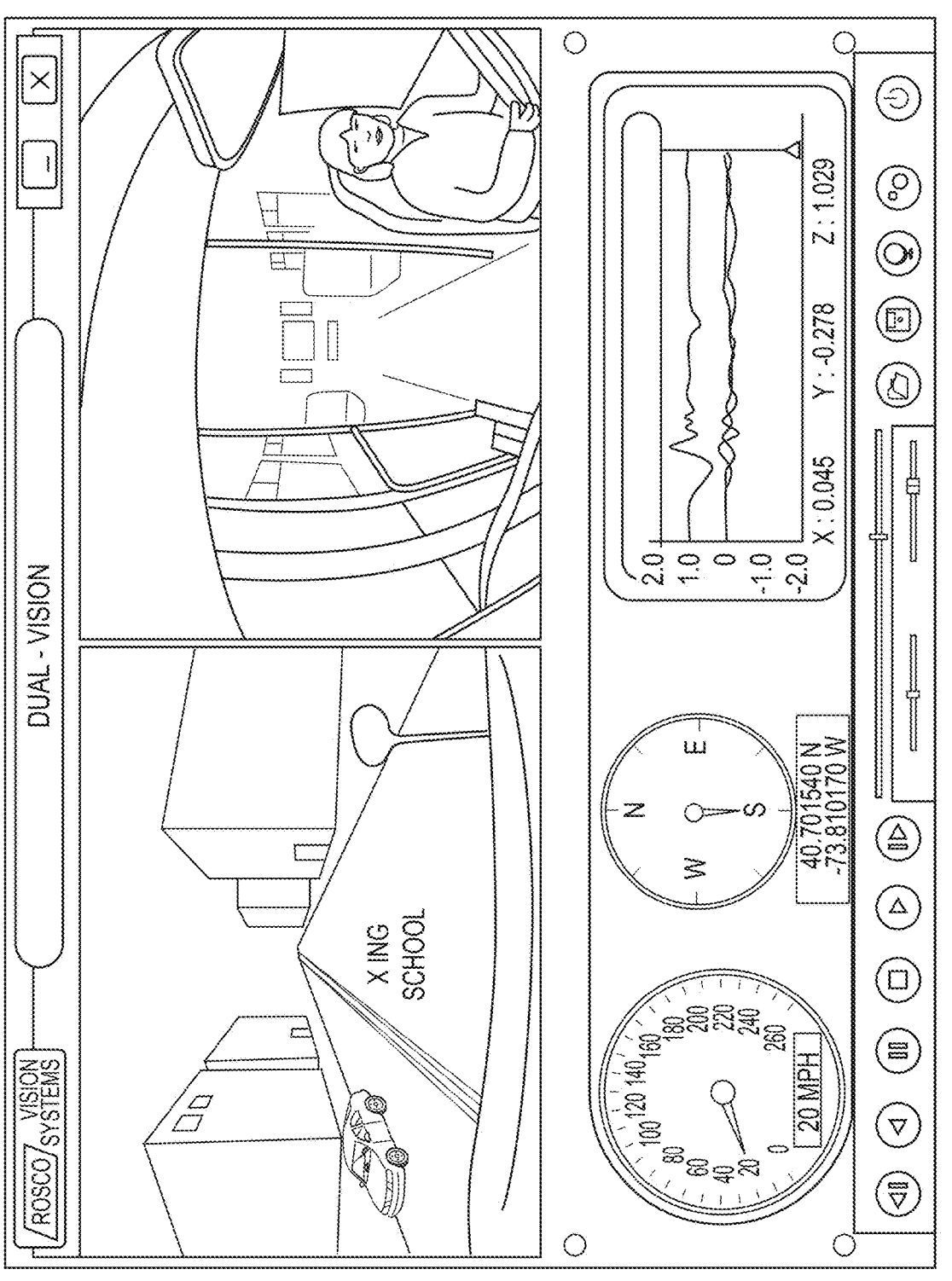
FIGS. 17a-b depict viewing software according to some embodiments of the present invention
Figure 17B:
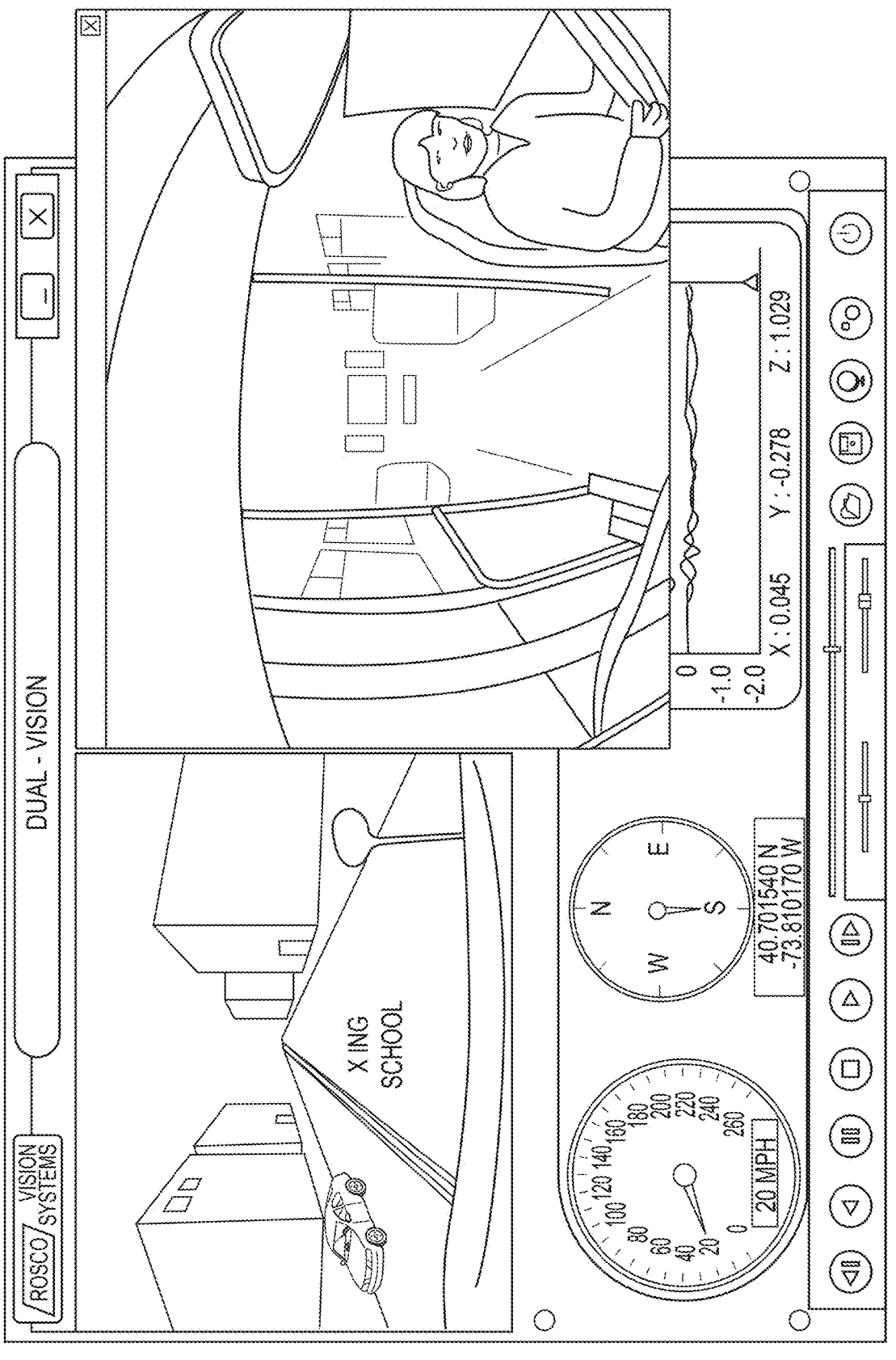

Referring to FIG. 15, one embodiment of the review software is depicted. As shown, windows 200 and 202 are provided to allow viewing of the video captured by the first camera 15 and second camera 19. As will be appreciated, additional cameras and associated windows may be provided for the system to allow captured video in other directions. Referring to FIGS. 17a and 17b, clicking on one of windows 200 or 202 with a mouse temporarily enlarges the window to provide more detail for review. A second click on an enlarged window returns the window to its original size. Referring again to FIG. 15, compass 204 indicates the direction of travel of the vehicle during the portion of video under review. Direction of travel of the vehicle may be determined at the time of recording by one or more of a compass or a GPS receiver. GPS coordinate window 206 indicates the location of the vehicle at during the portion of the video under review in longitude and latitude. The GPS coordinates can be determined at the time of recording by one or more of a GPS receiver or dead reckoning device. Window 208 indicates the output of the 2-d or 3-d accelerometers and displays vehicle motion and any impact detected by the accelerometers graphically in 3-axis. Playback controls 210 allow a user to play, fast forward, rewind, play in slow motion and stop video playback of one or both camera video output. Playback controls also allow the user to change the playback speed of the video of one or both cameras. In addition, playback controls 210 allow personnel to advance or reverse the video of one or both of the cameras frame by frame. Controls also provide for volume adjustment of associated audio recordings. Speedometer 212 indicates the speed of the vehicle during the portion of video under review. Speed of the vehicle may be determined at the time of recording by one or more of a vehicle speedometer or a GPS receiver. The file controls 214 allow a file to be opened, conversion of the file into AVI format (or other appropriate file format), link the recorded data with a map, access other system features, e.g., a system setup menu, exit or close the review program and hide or close the review window(s).

Figure 18:
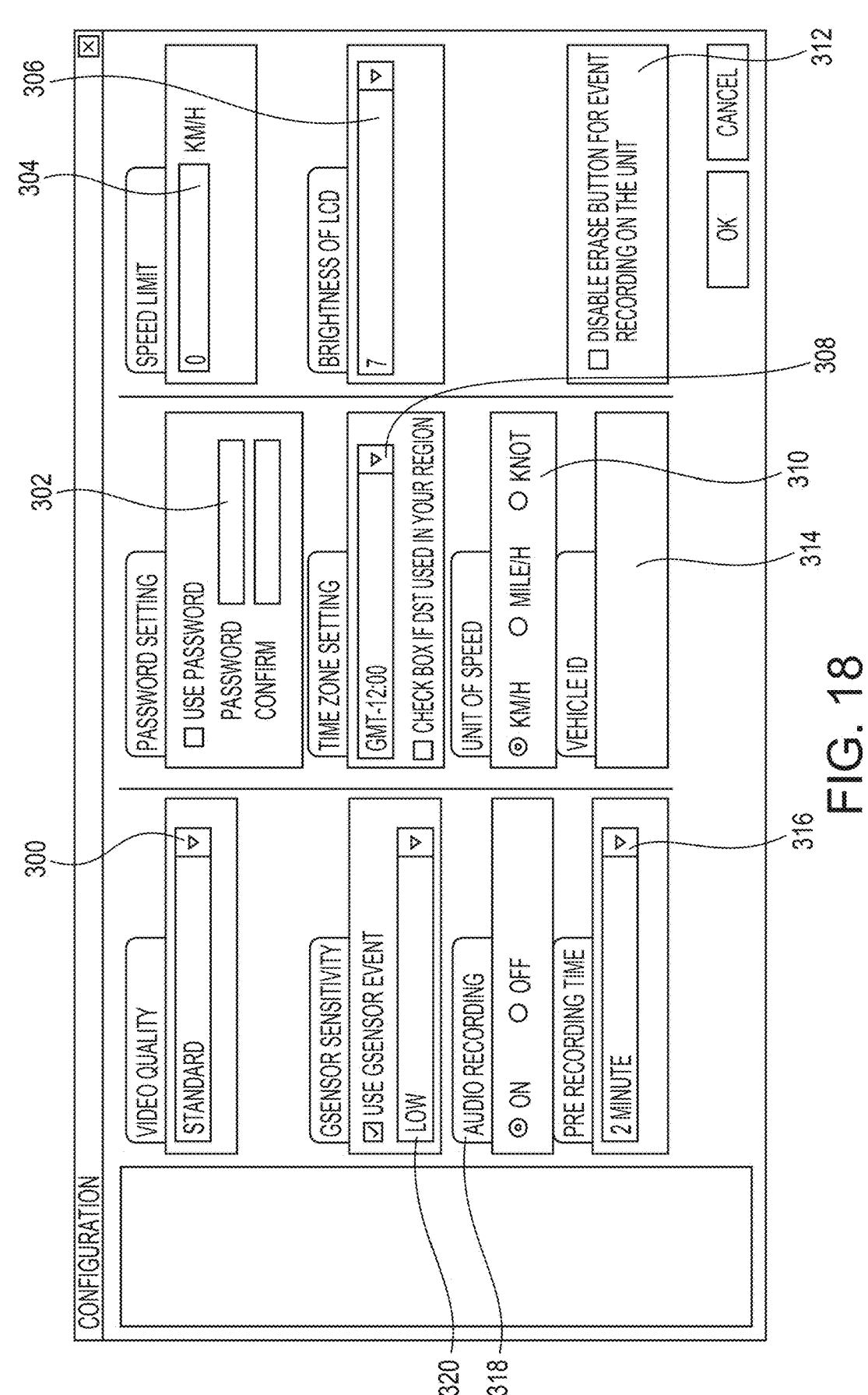
FIG. 18 depicts a system configuration window according to one embodiment of the present invention.

Referring to FIG. 18, one embodiment of management software is depicted. Management software allows a transportation manager or other authorized personnel to change settings associated with the dual-camera system 10 during operation. Video quality adjustment 300 allows the quality of one or both of the cameras to be adjusted. In certain embodiments a default setting is provided, whereas in other embodiments, personnel may set the video quality based upon, low, standard or high resolution designations, or by video resolution, e.g., 480×600, etc. Password setting window 302 allows the authorized personnel to designate a password to prevent further changes to the system 10 settings without entry of the selected password. Password setting window 302 is also used to indicate the password required for entry to view stored recording events. Speed limit window 304 allows personnel to indicate the speed above which a chime will sound and/or a recording event is triggered to capture video of the triggering event for later review. LCD brightness adjustment 306 allows the setting of the LCD brightness in embodiments in which an associated monitor, e.g., LCD screen, is provided as part of or in addition to the dual-camera system 10. Time zone setting adjustment 308 allows setting of the time associated with the system which will be recorded along with associated video. Unit of speed adjustment 310 allows selection of the unit of speed of the vehicle with the associated video. In some embodiments, dual-camera system 10 is provided with an erase button that allows a driver to erase all previously recorded recording events in memory. In embodiments in which an erase button is provided, disable selection indicator 312 is provided to allow personnel to determine whether the button is enabled or disable for driver use. Vehicle ID window 314 allows for the association of a license plate number and/or vehicle fleet number with a particular dual-camera system 10. Pre-recording time window 316 allows personnel to determine the amount of pre-recording event video stored with each recording event. For example, 1, 2 or 3 minutes of video before a recording a event may be stored in addition to the recording event to allow a reviewer to view actions leading up to a recording event, e.g., an accident. GSensor sensitivity window 320 allows personnel to determine the sensitivity of 2-d or 3-d accelerometers associated with the dual-camera system, where the sensitivity determines whether a recording event will be triggered.

Figure 19:
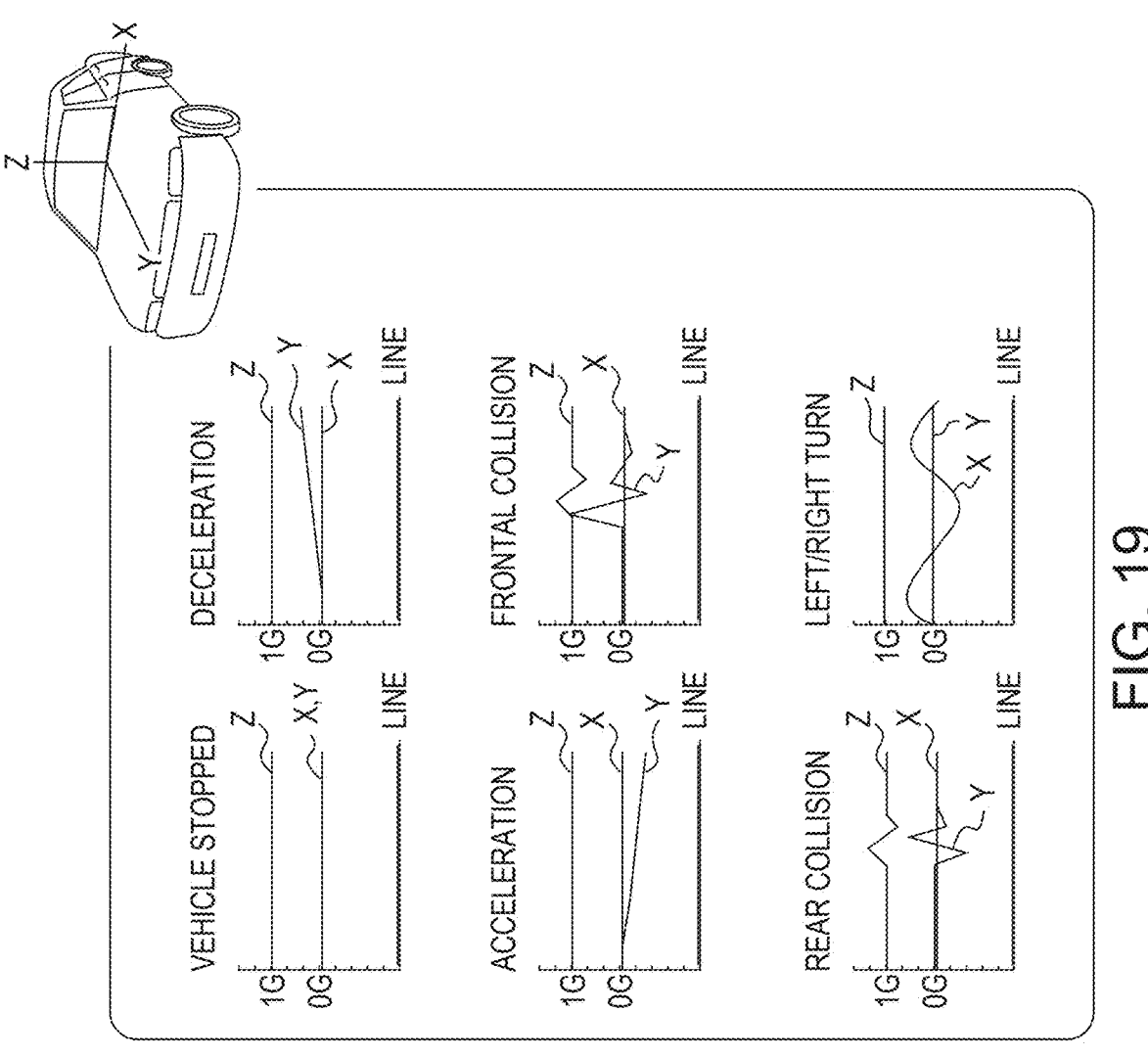
FIG. 19 depicts exemplary accelerometer responses for various recording events according to one embodiment of the present invention.

Referring to FIG. 19, several examples of accelerometer output as would be displayed in window 208 are depicted. As shown, the 2-d and/or 3-d accelerometer within the system 10 enables measurement of, for example, the vehicle stopped, decelerating, accelerating, a frontal collision, a rear collision and left or right turns. As will be understood, the graphs shown in FIG. 19 are representative and are not exclusive to the measurements that may be recorded by the accelerometers.

Figure 16:
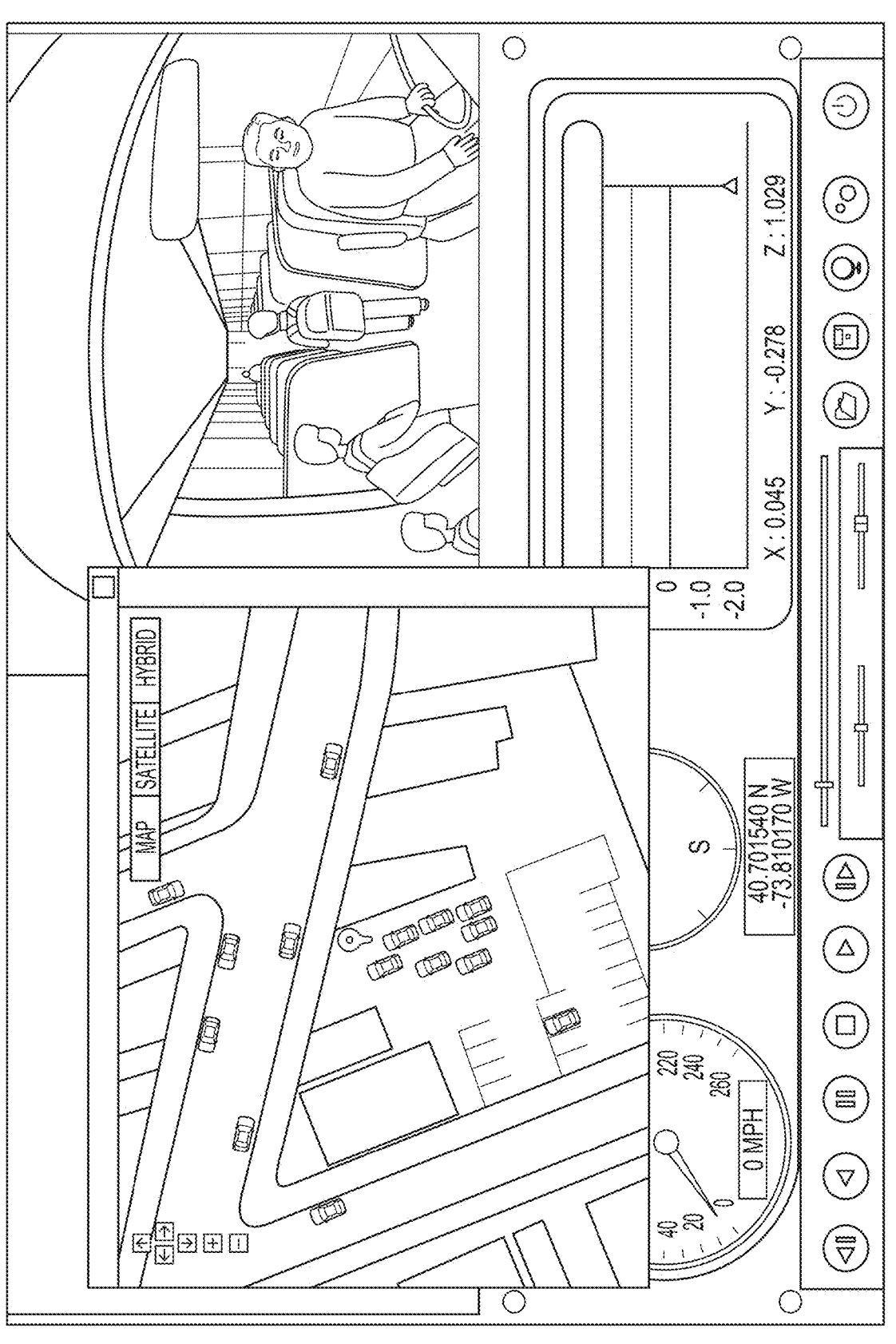
FIG. 16 depicts viewing software according to some embodiments of the present invention.

Referring to FIG. 16, according to an alternative embodiment of the review software, a reviewer is able to simultaneously view video captured by one or both cameras in addition to a map displaying the position of the vehicle at the time the video was captured. The position of the vehicle is determined with an associated GPS receiver, which is recorded in memory as described elsewhere in this disclosure. According to various embodiments, the present invention is configured to work with third-party mapping software, for example, Google Earth™ that allows a user to view positions in satellite photos of the vehicle location.

Referring to FIGS. 17a and 17b, an embodiment of the review software is depicted. The review software is advantageously configured to allow a user to select a video window for enlargement so that a user may inspect detail within the video. The user may select one or both of the video captured by the first camera or the second camera to be enlarged. The user may select the video for enlargement by clicking a mouse or other indication peripheral device or by one or more keystrokes on a keyboard.

According to an embodiment of the present invention, software allows a user to review stored recording events on the memory, e.g., SD memory card, in a number of ways. For example, when opening a file associated with a recording event the user may be able to organize the files by name, record time (e.g., the date and time when the images were recorded), event type (e.g., whether the recording event was triggered manually, by a braking event, g-force event, etc.) or speed limit (e.g., the associated speed of the vehicle at the time the recording event was captured).

In alternative embodiments, the software processes of the present invention perform one or more of the following:
  allow manager to download all stored video or just recording/predetermined events.
  can search video and sort by driver name or vehicle name
  can search video by vehicle location (using GPS data embedded in video) can search video and/or specific recording events based on user, time, locations and/or type of event A manual describing in detail the software processes of the present invention is attached. In addition, the manual is included in U.S. Provisional Application Ser. No. 61/245,080, filed Sep. 23, 2009 and incorporated herein by reference.

Figure 20:
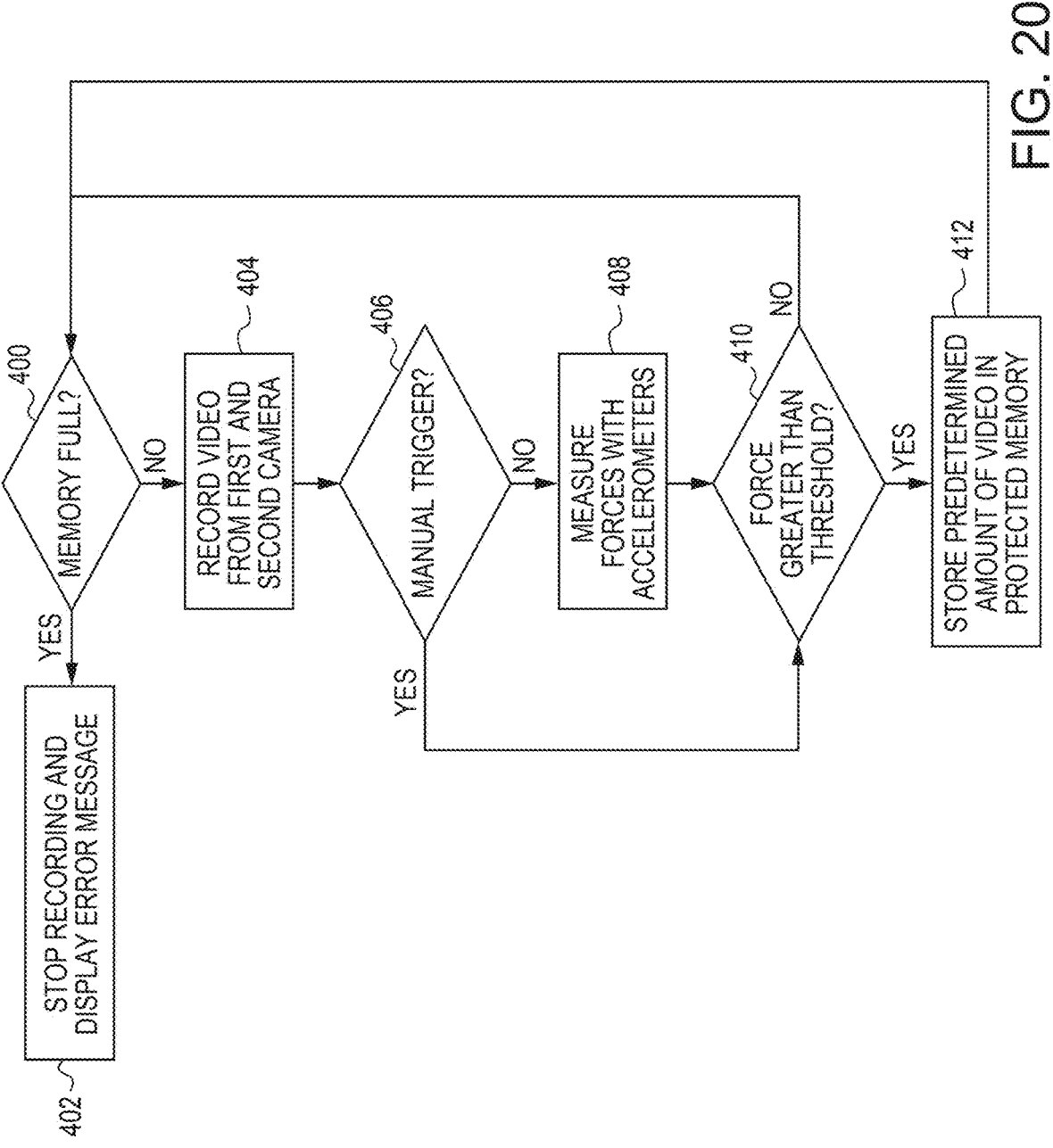
FIG. 20 depicts a flowchart of a method according to one embodiment of the present invention.

Referring to FIG. 20, a flow chart depicts a method according to one embodiment of the present invention. In operation, the dual camera system initially determines at step 400 whether the associated memory for storing recording events is full. If the memory is full, at step 402 the system stops recording additional recording events and displays an appropriate error message indicating that the memory is full or is incapable of recording additional video. If the memory is not full, at step 404 the system records video from the first and second cameras in a continuous loop, as described elsewhere in this specification. If a manual trigger is supplied at step 406, for example by a driver indicating an event of interest, the system proceeds to step 412 and stores a predetermined amount of video from the first and second cameras in a protected region of the associated memory. In addition, as indicated at step 408, the system continuously measures forces in two or three axis with associated accelerometers. If the force measured by associated accelerometers exceeds a predetermined threshold, as shown by step 410, the system proceeds to step 412, which proceeds as described above. Otherwise, the system continues to record video in a continuous loop, as indicated by the arrow returning the method to step 400.

Figure 21:
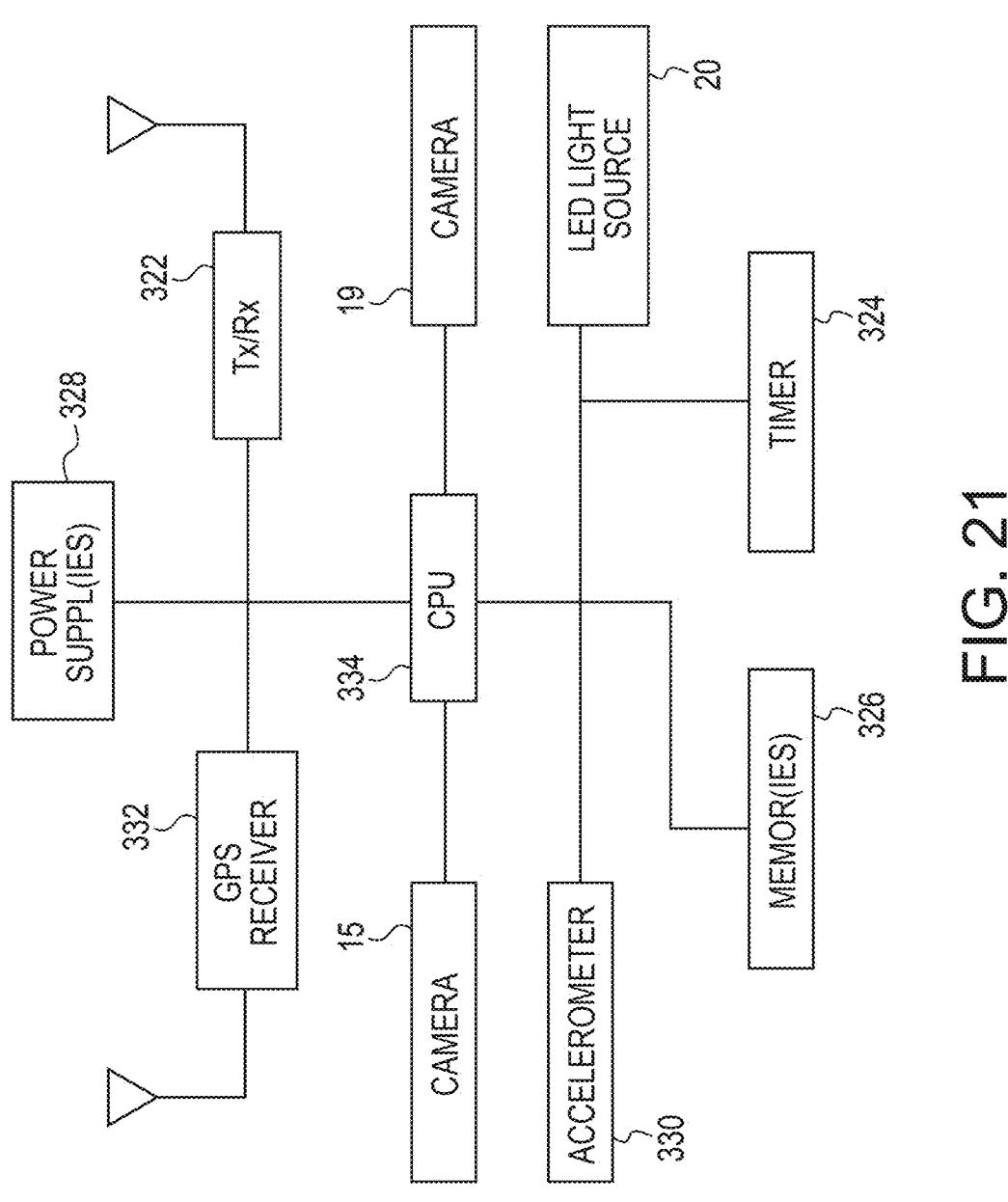
FIG. 21 depicts a block diagram of a dual camera system according to one embodiment of the present invention.

Referring to FIG. 21, a hardware embodiment of a dual-camera system according to the present invention is depicted. Each of a first camera 15, a second camera 19, an LED light source 20, a timer 324, memory 326, accelerometer 330, GPS receiver 332 and transmitter 322 are connected to a CPU 334. First camera 19 configured to provide a viewing area in a first direction and a second camera 19 configured to provide a viewing area in a second direction are provided. An LED light source 20 is provided to illuminate the interior of a vehicle. In some embodiments, the LED light source 20 may provide illumination in an infrared spectrum. Timer 324 is used to determine an amount of time during which video and/or still images will be captured by the cameras after the vehicle has been turned off. According to various embodiments, the timer 324 is a part of the CPU 334 or is a software program configured to be run on the CPU 334. Accelerometer 330 is used to measure the force applied to the vehicle in at least two directions, and the system is configured to record, upon a measurement of a force by the accelerometer 330 beyond a predetermined threshold, a predetermined length of video from at least one of the first camera 15 and the second camera 19 in a protected area of one or more memories 326. GPS receiver 332 is used to determine the location of the vehicle and may be used to calculate the speed, direction of travel and the latitude and longitude of the vehicle.

Transmitter 322 may be used to wirelessly transmit data stored in memory 326 for review at another location. In other embodiments, transmitter 322 may be configured to transmit infra-red pulses or Bluetooth to communicate with a handheld device. In other embodiments, transmitter is configured to receive information from a transmitter, such as a handheld device, to provide software updates, firmware updates or configuration commands. One or more power supplies 328 may provide power to each of the GPS receiver 332, transmitter 322, second camera 19, LED light source 20, timer 324, memory 326, accelerometer 330, first camera

15 and CPU 334. In other embodiments, one or more power sources may be provided to supply power to individual components separately.

It should be understood that each embodiment of the present invention may be implemented with any number of cameras, LED light sources, timers, memories, accelerometers, GPS receivers, transmitters, power sources and transmitters without departing from the spirit of the invention.

While the invention has been described with reference to specific embodiments, the description is illustrative of the invention and in not to be construed as limiting. The invention can be utilized for a multitude of purposes (e.g., trucks, cars, buses, tanks, and any other optical apparatus). Other embodiments, extensions and modifications of the ideas presented above are comprehended and within the reach of one versed in the art upon reviewing the present disclosure. Accordingly, the scope of the present invention in its various aspects should not be limited by the examples and embodiments presented above. The individual aspects of the present invention and the entirety of the invention should be regarded so as to allow for such design modifications and future developments within the scope of the present disclosure.

What is claimed is:

1. A system for determining driver distraction when operating a vehicle while recording vehicle data, comprising:
   a housing having a first camera and a second camera, the first camera is aligned with a first viewing area of the vehicle and the second camera is aligned with a second viewing area of the vehicle;
   a first data recorded by the first camera;
   a second data recorded by the second camera;
   at least one of: the first data or the second data comprising a recorded video to enable review of events;
   at least one memory configured to store at least one of: the first data or the second data;
   a timer configured to determine a predetermined amount of time during which video will be captured by the first and second cameras after the vehicle has been turned off; and
   a plurality of sensors for measuring at least one of: a vehicle acceleration, a vehicle speed, a direction of travel, or a location of the vehicle, wherein distractions to the driver can be detected by using at least one of the first data or the second data.

2. A system for determining driver distraction when operating a vehicle while recording vehicle data according to claim 1, wherein an oldest captured video is overwritten with a newest captured video when the at least one memory is full.

3. A system for determining driver distraction when operating a vehicle while recording vehicle data according to claim 1, wherein the recorded video is in a continuous loop recording over the oldest captured video with the newest captured video without recording over a protected portion.

4. A system for determining driver distraction when operating a vehicle while recording vehicle data according to claim 1, further comprising a trigger, wherein upon activation of the trigger, the system is configured to at least one of: store the recorded video in a protected portion of the at least one memory or store the recorded video with a predetermined length of video from at least one of the first camera or the second camera.

5. A system for determining driver distraction when operating a vehicle while recording vehicle data according to claim 1, further comprising an accelerometer to enable measurement of at least one of: the vehicle stopped, the vehicle decelerating, the vehicle accelerating, a frontal collision, a rear collision, a vehicle left turn, or a vehicle right turn.

6. A system for determining driver distraction when operating a vehicle while recording vehicle data according to claim 1, wherein the system is configured to determine the occurrence of a predetermined event, including at least one of: a braking event or a predetermined vehicle operation, and store an additional data associated with the predetermined event.

7. A system for determining driver distraction when operating a vehicle while recording vehicle data according to claim 1, wherein the system is configured to determine the occurrence of a predetermined event including at least one of: the vehicle decelerating faster than a predetermined rate, the vehicle accelerating faster than a predetermined rate, or a collision.

8. A system for determining driver distraction when operating a vehicle while recording vehicle data according to claim 7, wherein the system is configured to protect at least a portion of first and second data to enable a reviewer to view the interior and exterior of the vehicle for a portion of time leading to, during or after, the occurrence of the predetermined event.

9. A system for determining driver distraction when operating a vehicle while recording vehicle data according to claim 1, further comprising a transmitter configured to wirelessly transmit data stored in the at least one memory for review at another location.

10. A system for determining driver distraction when operating a vehicle while recording vehicle data, comprising:

a housing having a first camera and a second camera, the first camera is aligned with a first viewing area of the vehicle and the second camera is aligned with a second viewing area of the vehicle;

a first data recorded by the first camera;

a second data recorded by the second camera;

at least one of: the first data or the second data comprising a recorded video to enable review of events including distractions to a driver;

at least one memory having a protected portion and configured to store at least one of: the first data or the second data; and at least one accelerometer configured to measure an acceleration applied to the vehicle in at least two directions, wherein upon activation of a trigger, the system is configured to at least one of: store the recorded video in the protected portion of the at least one memory or store the recorded video with a predetermined length of video from at least one of the first camera or the second camera.

11. A system for determining driver distraction when operating a vehicle while recording vehicle data according to claim 10, wherein an oldest captured video is overwritten with a newest captured video when the at least one memory is full.

12. A system for determining driver distraction when operating a vehicle while recording vehicle data according to claim 10, wherein the recorded video is in a continuous loop recording over the oldest captured video with the newest captured video without recording over the protected portion.

13. A system for determining driver distraction when operating a vehicle while recording vehicle data according to claim 10, wherein the accelerometer is configured to enable measurement of at least one of: the vehicle stopped, the vehicle decelerating, the vehicle accelerating, a frontal collision, a rear collision, a vehicle left turn, or a vehicle right turn.

14. A system for determining driver distraction when operating a vehicle while recording vehicle data according to claim 10, wherein the system is configured to determine the occurrence of a predetermined event, including at least one of: a braking event or a predetermined vehicle operation, and store additional data associated with the predetermined event.

15. A system for determining driver distraction when operating a vehicle while recording vehicle data according to claim 10, wherein the system is configured to determine the occurrence of a predetermined event including at least one of: the vehicle decelerating faster than a predetermined rate, the vehicle accelerating faster than a predetermined rate, or a collision.

16. A system for determining driver distraction when operating a vehicle while recording vehicle data according to claim 15, wherein the system is configured to protect at least a portion of first and second data to enable a reviewer to view the interior and exterior of the vehicle for a portion of time leading to, during or after, the occurrence of the predetermined event.

17. A system for determining driver distraction when operating a vehicle while recording vehicle data according to claim 10, further comprising a timer configured to determine a predetermined amount of time during which video will be captured by the first and second cameras after the vehicle has been turned off.

18. A system for determining driver distraction when operating a vehicle while recording vehicle data according to claim 10, further comprising a transmitter configured to wirelessly transmit data stored the at least one memory for review at another location.

19. A system for determining driver distraction when operating a vehicle while recording vehicle data, comprising:

a housing having a first camera and a second camera;

a first data recorded by the first camera toward a first viewing area of the vehicle;

a second data recorded by the second camera toward a second viewing area of the vehicle, said second viewing area is different from the first viewing area;

at least one of: the first data or the second data comprising a recorded video to enable review of events including distractions to a driver;

at least one memory configured to receive and store at least one of: the first data or the second data; and a detector configured to detect a plurality of vehicle motions or impacts including: when the vehicle is stopped, decelerated, accelerated, having a frontal collision, having a rear collision, having a left turn, and having a right turn.

20. A system for determining driver distraction when operating a vehicle while recording vehicle data according to claim 19, further comprising a trigger, wherein upon activation of the trigger, the system is configured to at least one of: store the recorded video in a protected portion of the at least one memory or store the recorded video with a predetermined length of video from at least one of the first camera or the second camera.

* * * * *